United States Patent
Kim et al.

(10) Patent No.: US 10,946,520 B2
(45) Date of Patent: Mar. 16, 2021

(54) MOBILE ROBOT SYSTEM AND CONTROL METHOD THEREOF

(71) Applicant: LG ELECTRONICS INC., Seoul (KR)

(72) Inventors: Minuk Kim, Seoul (KR); Woochan Jun, Seoul (KR); Suuk Choe, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 415 days.

(21) Appl. No.: 15/874,448

(22) Filed: Jan. 18, 2018

(65) Prior Publication Data
US 2018/0200888 A1 Jul. 19, 2018

(30) Foreign Application Priority Data
Jan. 18, 2017 (KR) .......................... 10-2017-0008874

(51) Int. Cl.
*G05B 19/04* (2006.01)
*G05B 19/18* (2006.01)
(Continued)

(52) U.S. Cl.
CPC ............. *B25J 9/1666* (2013.01); *A47L 9/009* (2013.01); *A47L 9/2857* (2013.01); *A47L 11/24* (2013.01);
(Continued)

(58) Field of Classification Search
CPC .. A47L 11/24; A47L 11/4061; A47L 2201/04; A47L 9/009; A47L 9/2857;
(Continued)

(56) References Cited

U.S. PATENT DOCUMENTS

| 10,046,458 B2 | 8/2018 | Yan |
| 2009/0164123 A1 | 6/2009 | Moriguchi |

(Continued)

FOREIGN PATENT DOCUMENTS

| JP | 2012-022467 | 2/2012 |
| KR | 10-2009-0077547 | 7/2009 |

(Continued)

OTHER PUBLICATIONS

International Search Report dated Jul. 4, 2018 issued in Application No. PCT/KR2018/000829.

(Continued)

*Primary Examiner* — Harry Y Oh
(74) *Attorney, Agent, or Firm* — Ked & Associates, LLP

(57) ABSTRACT

A mobile robot system and a related control method sets a virtual wall as a specific area so that a mobile robot cannot approach within a cleaning area to restrict a traveling of the mobile robot, registers the virtual wall on a map when the virtual wall for restrict the approach of the mobile robot is set by a terminal, calculates a location of the virtual wall for the cleaning area to avoid the virtual wall, and restricts the approach of the mobile robot by matching the virtual wall to the cleaning area, controlling the mobile robot as if an actual physical obstacle exists by setting the virtual wall on the map through the terminal and matching to an actual cleaning area, and achieving an easy cleaning setting and effectively controlling the mobile robot as it can be plurally set at a desired location irrespective of the number.

18 Claims, 20 Drawing Sheets

(51) Int. Cl.
  *B25J 9/16* (2006.01)
  *A47L 9/00* (2006.01)
  *A47L 11/40* (2006.01)
  *B25J 9/00* (2006.01)
  *A47L 11/24* (2006.01)
  *G05D 1/02* (2020.01)
  *A47L 9/28* (2006.01)

(52) U.S. Cl.
  CPC ......... *A47L 11/4061* (2013.01); *B25J 9/0003* (2013.01); *G05D 1/021* (2013.01); *A47L 2201/04* (2013.01)

(58) Field of Classification Search
  CPC ....... B25J 9/0003; B25J 9/1666; G05D 1/021; G05D 1/0238; G05D 1/0246; G05D 1/0274; G05D 2201/0203
  See application file for complete search history.

(56) References Cited

U.S. PATENT DOCUMENTS

| | | |
|---|---|---|
| 2009/0182464 A1 | 7/2009 | Myeong et al. |
| 2013/0098401 A1 | 4/2013 | Yoon et al. |
| 2013/0166134 A1 | 6/2013 | Shitamoto et al. |
| 2015/0032260 A1* | 1/2015 | Yoon ................... A47L 11/4011 700/257 |
| 2015/0185313 A1* | 7/2015 | Zhu ....................... G01S 7/4817 356/5.01 |
| 2016/0274579 A1* | 9/2016 | So ........................ A47L 11/4011 |
| 2017/0265703 A1 | 9/2017 | Park et al. |
| 2017/0269595 A1 | 9/2017 | Chen |
| 2018/0074508 A1* | 3/2018 | Kleiner ................ G05D 1/0016 |
| 2018/0373242 A1* | 12/2018 | Han ....................... A47L 9/2894 |
| 2019/0163175 A1* | 5/2019 | Ko ........................ G05D 1/0088 |
| 2019/0246852 A1* | 8/2019 | Klintemyr ............ A47L 9/2826 |

FOREIGN PATENT DOCUMENTS

| | | |
|---|---|---|
| KR | 10-2013-0027339 | 3/2013 |
| KR | 10-2013-0044131 | 5/2013 |
| KR | 10-2014-0087486 | 7/2014 |
| KR | 10-2015-0014237 | 2/2015 |
| KR | 10-2016-0021991 | 2/2016 |
| KR | 10-2016-0098700 | 8/2016 |
| TW | 200800684 | 1/2008 |
| TW | 201006635 | 2/2010 |
| TW | 201627790 | 8/2016 |
| TW | M527299 | 8/2016 |

OTHER PUBLICATIONS

Korean Office Action dated Aug. 29, 2018 issued in Application No. 10-2017-0008874.

Taiwanese Office Action dated Dec. 5, 2018 issued in TW Application No. 107101901.

Korean Office Action dated Jun. 23, 2020 issued in KR Application No. 10-2017-0008874.

* cited by examiner (a)

(b)

(a)

(b)

(a)

(b)

(c)

(a)

(b)

(c)

(a)

(b)

(c)

(a)

(b)

(a)

(b)

(c)

(d)

MOBILE ROBOT SYSTEM AND CONTROL METHOD THEREOF

CROSS-REFERENCE TO RELATED APPLICATION

This application claims priority under 35 U.S.C. § 119 to Korean Application No. 10-2017-0008874, filed on Jan. 18, 2017, whose entire disclosure is hereby incorporated by reference.

BACKGROUND

1. Field

The present disclosure relates to a mobile robot system and a control method thereof, and more particularly, to a mobile robot system which performs cleaning by traveling in a cleaning area and a control method thereof.

2. Background

Generally, a mobile robot (also referred to herein as a robot cleaner or an autonomous cleaner) is an apparatus which automatically travels in an area to be cleaned without user's handling and automatically performs cleaning by suctioning foreign substances such as dust from the floor surface. The mobile robot detects a distance to an obstacle such as furniture installed in a cleaning area, office supplies, wall, and the like, and then maps the cleaning area, or performs an obstacle avoidance operation by controlling the driving of the left and right wheels.

Even if the mobile robot detects an obstacle, it approaches the obstacle and, then, changes a route or moves to another route so as to perform cleaning. However, when the mobile robot approaches the obstacle and the obstacle is damaged, for example, when the mobile robot approaches a flowerpot or a vase and the flowerpot or the vase is collapsed, breakage may occur due to the collapse. In addition, it sometimes happens that the mobile robot approaches an obstacle and falls on a stairway, or climbs up a threshold or certain obstacle and is isolated.

Thus, if the mobile robot is designed to avoid an obstacle when the mobile robot detects the obstacle, it is impossible to perform cleaning of a corresponding area. Accordingly, based on the process that an operation of the mobile robot is set after approaching the obstacle, it has been sought to prevent the mobile robot from approaching certain area of the cleaning area.

A device for generating a certain signal is provided in the cleaning area so as to prevent the mobile robot from approaching the cleaning area, so that an area set by the device cannot be approached. However, since it is required to purchase a device for generating a signal separately, the additional purchase incurs expense, and since the device for generating a signal should be installed indoors, there is a constraints due to installation space. Further, in the case of using the device for generating a signal, the mobile robot cannot know the location and size of the area set by the signal. Therefore, there is a problem that the mobile robot repeatedly detects a corresponding signal while moving.

Since the user is considered as an obstacle when moving within the cleaning area, inconvenience to user may be caused. In addition, since a corresponding device should be installed in every necessary area, it is troublesome to move and install the device in every cleaning.

BRIEF DESCRIPTION OF THE DRAWINGS

The embodiments will be described in detail with reference to the following drawings in which like reference numerals refer to like elements wherein.

DETAILED DESCRIPTION

Exemplary embodiments of the present disclosure are described with reference to the accompanying drawings in detail. The same reference numbers are used throughout the drawings to refer to the same or like parts. Detailed descriptions of well-known functions and structures incorporated herein may be omitted to avoid obscuring the subject matter of the present disclosure. Further, the present disclosure specifies that a controller and a configuration of other components can be implemented by one or more processors, and can be implemented by hardware device.

Figure 1:
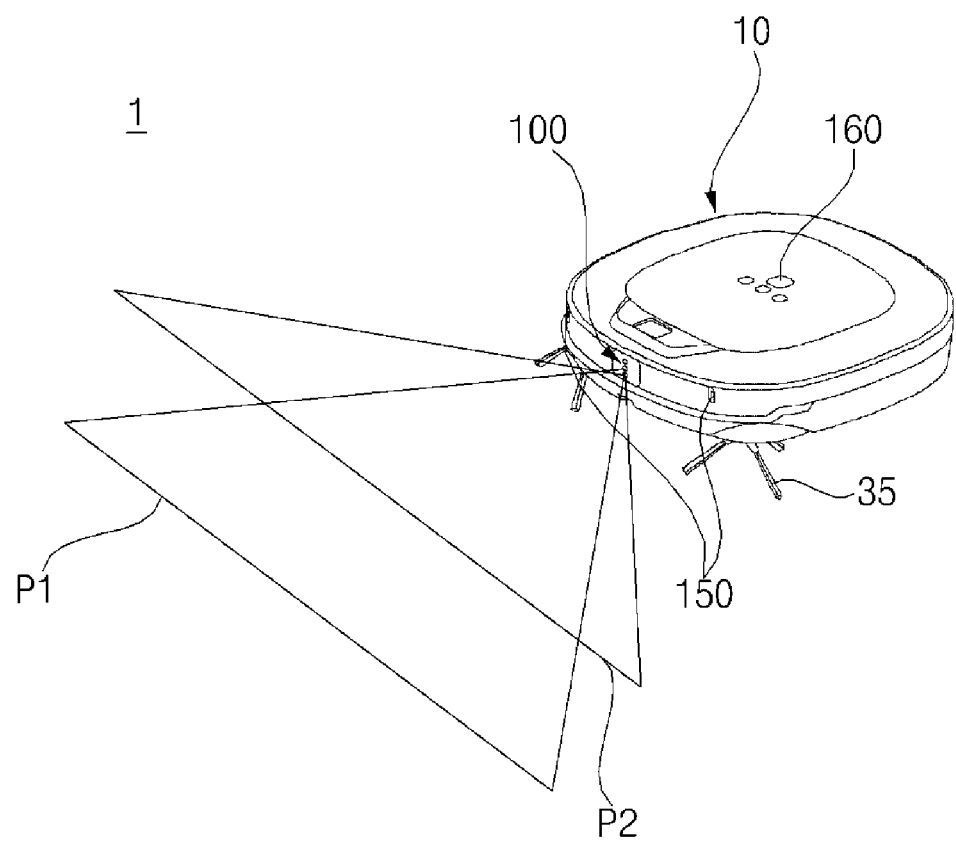
FIG. 1 is a perspective view of a mobile robot according to an embodiment of the present disclosure.
Figure 2:
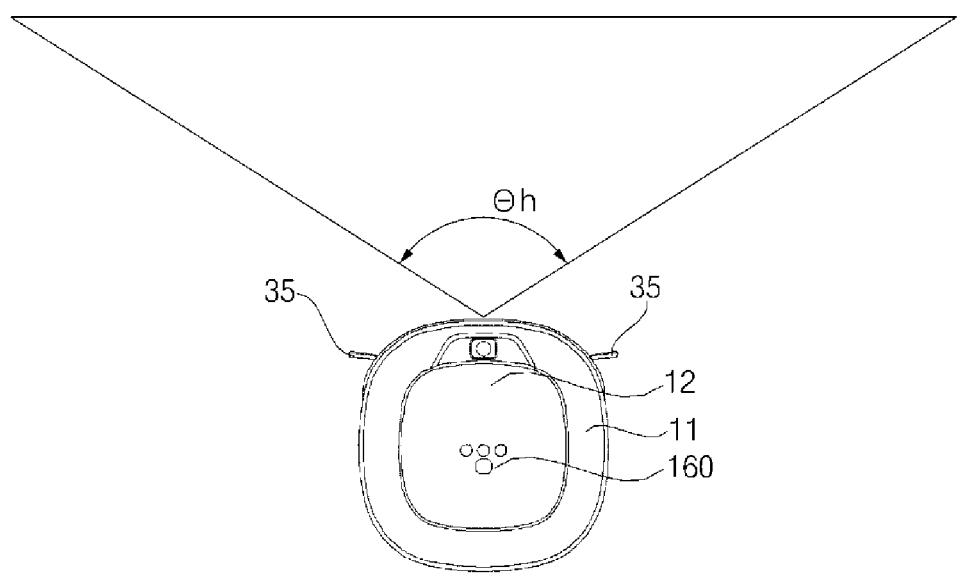
FIG. 2 is a view illustrating a horizontal angle of view of the mobile robot of FIG. 1.
Figure 3:
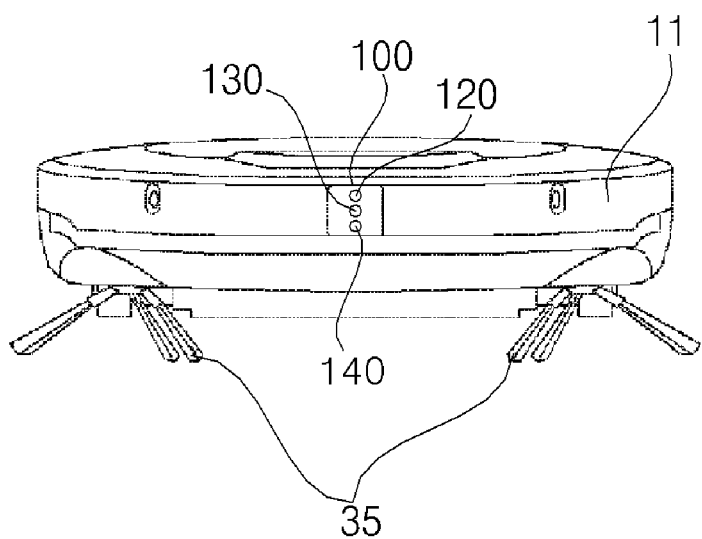
FIG. 3 is a front view of the mobile robot of FIG. 1.
Figure 4:
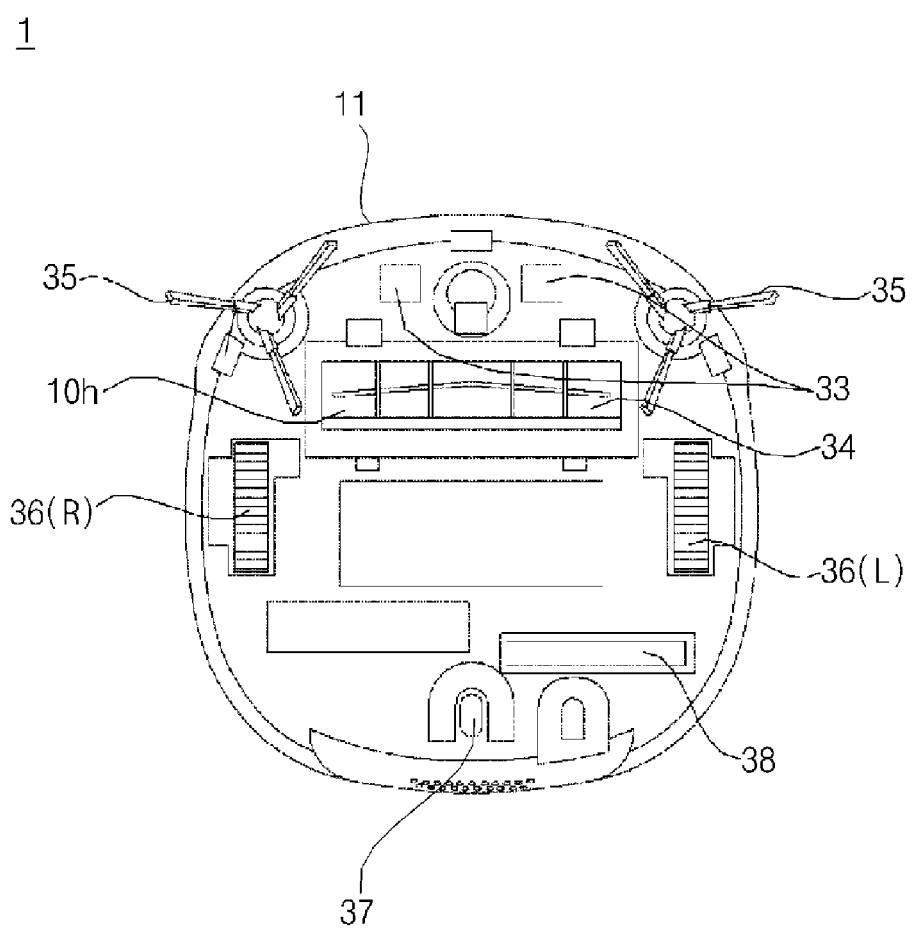
FIG. 4 is a bottom view of the mobile robot of FIG. 1.

FIG. 1 is a perspective view of a mobile robot according to an embodiment of the present disclosure, FIG. 2 is a view illustrating a horizontal angle of view of the mobile robot of FIG. 1, FIG. 3 is a front view of the mobile robot of FIG. 1, and FIG. 4 is a bottom view of the mobile robot of FIG. 1. Referring to FIGS. 1 to 4, the mobile robot 1 according to an embodiment of the present disclosure may include a main body 10 which moves along the floor of a cleaning area and sucks foreign substances such as dust on the floor, and an obstacle detection unit (or obstacle sensor) 100 which is provided on the front of the main body 10.

The main body 10 may include a casing 11 which forms an appearance and forms a space for accommodating parts constituting the main body 10 inwardly, a suction unit 12 which is provided in the casing 11 and sucks foreign substances such as dust, trash, etc, and a left wheel 36(L) and a right wheel 36(R) which are rotatably provided in the casing 11. As the left wheel 36(L) and the right wheel 36(R) rotate, the main body 10 may move along the floor of the cleaning area, and, during this process, foreign substances may be sucked through a suction unit 34.

The suction unit 34 may include a suction fan (not shown) for generating a suction force and a suction port 10h for sucking the air stream generated by the rotation of the suction fan. The suction unit 34 may include a filter (not shown) for collecting foreign substances in the air stream sucked through the suction port 10h, and a foreign substances collecting box (not shown) in which foreign substances collected by the filter are accumulated.

In addition, the main body 10 may include a travel driving unit for driving the left wheel 36(L) and the right wheel 36(R). The travel driving unit may include at least one driving motor. At least one driving motor may include a left wheel driving motor for rotating the left wheel 36(L) and a right wheel driving motor for rotating the right wheel 36(R).

The left and right wheel driving motor and the right wheel driving motor may be controlled to be operated independently by a travel controller of a controller, so that the main body 10 can go forward, backward, or turn round. For example, when the main body 10 travels straight, the left wheel driving motor and the right wheel driving motor may be rotated in the same direction. However, when the left wheel driving motor and the right wheel driving motor are rotated at a different speed or rotated in the opposite direction, the traveling direction of the main body 10 can be changed. At least one auxiliary wheel 37 for stable support of the main body 10 may be further provided.

A plurality of brushes 35, which are located on the front side of the bottom surface of the casing 11 and have a plurality of radially extending feathering, may be further provided. The dusts may be removed from the floor of the cleaning area by the rotation of the brushes 35, so that the dusts separated from the floor may be sucked through the suction port 10h and gathered in the collecting box.

A control panel including an operation unit 160 for receiving various commands for controlling the mobile robot 1 from a user may be provided on the upper surface of the casing 11.

The obstacle detection unit 100 may be provided on the front surface of the main body 10. The obstacle detection unit 100 may be fixed to the front surface of the casing 11, and may include a first pattern irradiation unit 120, a second pattern irradiation unit 130, and an image acquiring unit 140. At this time, basically, as shown in the drawing, the image acquiring unit may be installed below the pattern irradiation unit, but may be provided between the first and second pattern irradiation units as the case may be. In addition, a second image acquiring unit (not shown) may be further provided at an upper end of the main body. The second image acquiring unit may capture an image of an upper end portion of the main body, i.e., a ceiling.

The main body 10 may be provided with a rechargeable battery 38. A charging terminal 33 of the battery 38 may be connected to a commercial power source (e.g., a power outlet in a home), or the main body 10 may be docked to a separate charging stand (not shown) connected to the commercial power source, so that the charging terminal 33 can be electrically connected to the commercial power source, and the battery 38 can be charged. Electric components constituting the mobile robot 1 may be supplied with power from the battery 38. Therefore, in a state where the battery 38 is charged and the mobile robot 1 is electrically disconnected from the commercial power source, an automatic travelling can be achieved.

Figure 5:
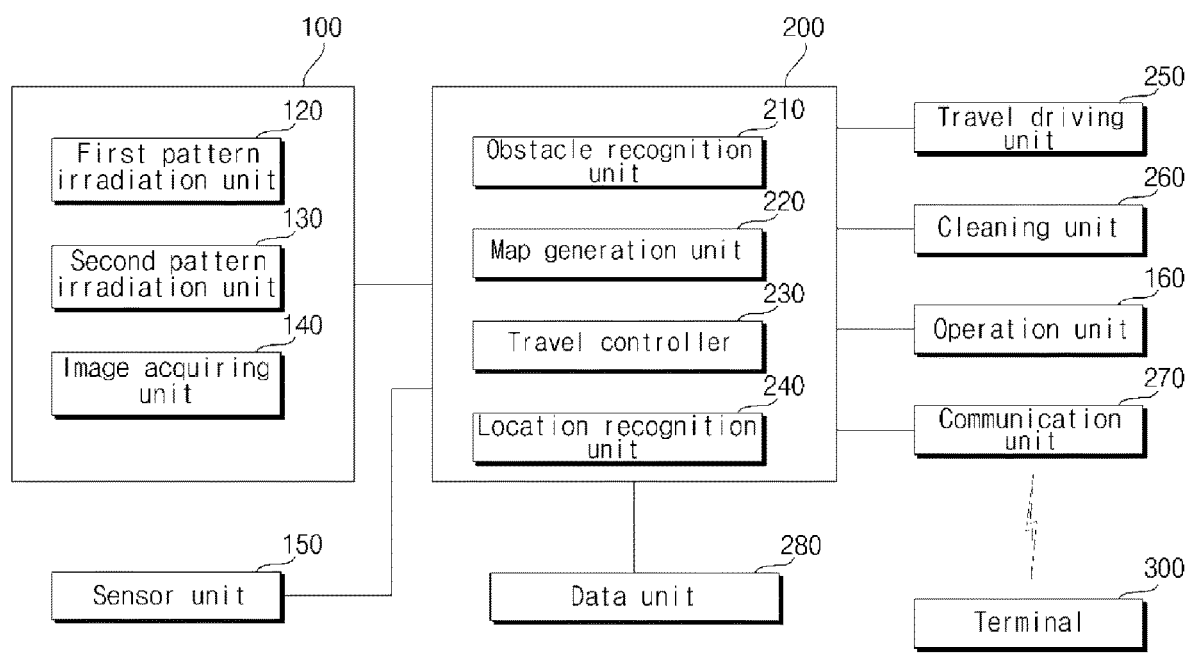
FIG. 5 is a block diagram illustrating a main parts of a mobile robot according to an embodiment of the present disclosure.

FIG. 5 is a block diagram illustrating a main parts of a mobile robot according to an embodiment of the present disclosure. As shown in FIG. 5, the mobile robot 1 may include a travel driving unit (or a driven wheel receiving a driving force from a motor) 250, a cleaning unit (or suction head) 260, a data unit (or memory) 280, an obstacle detection unit (or obstacle sensor) 100, a sensor unit (or sensor) 150, a communication unit (or communication interface) 270, an operation unit (or user interface) 160, and a controller 200 for controlling overall operation of the mobile robot 1 or components thereof.

The operation unit 160 may include an input means such as at least one button, switch, and touch pad, etc to receive a user command. The operation unit may be provided at the upper end of the main body 10, as described above.

The data unit 280 may store an obstacle detection signal input from the obstacle detection unit 100 or the sensor unit 150, may store reference data necessary for an obstacle recognition unit 210 to determine an obstacle, and may store obstacle information related to detected obstacle. In addition, the data unit 280 may store control data for controlling the operation of the mobile robot and data according to a cleaning mode of the mobile robot, and store a map, generated by a map generator, including obstacle information.

The data unit 280 may store a base map, a cleaning map, a user map, and a guide map. The obstacle detection signal may include a detection signal such as an ultrasonic wave/laser by the sensor unit, and an acquisition image of the image acquiring unit. The data unit 280 may store data that can be read by a microprocessor and may include a hard disk drive (HDD), a solid state disk (SSD), a silicon disk drive (SDD), ROM, RAM, CD-ROM, a magnetic tape, a floppy disk, and an optical data storage device.

The communication unit 270 may communicate with a terminal (not shown) in a wireless communication manner. In addition, the communication unit 270 may be connected to the Internet network through an in-home network, and may communicate with an external server or a terminal controlling the mobile robot.

The communication unit 270 may transmit the generated map to the terminal, receive a cleaning command from the terminal, and transmit data on the operation state of the mobile robot and the cleaning state to the terminal. The communication unit 270 may include not only a short-distance wireless communication module such as ZigBee, Bluetooth, etc but also a communication module such as Wi-Fi, WiBro, etc, and transmit and receive data.

Meanwhile, the terminal may be an apparatus in which a communication module is mounted to achieve a network connection and a program for controlling the mobile robot or an application for controlling the mobile robot is installed, and may be a computer, a laptop, a smart phone, a PDA, a tablet PC, or the like. In addition, the terminal may be a wearable device such as a smart watch.

The travel driving unit 250 may include at least one driving motor and allow the mobile robot to travel according to a control command of a travel controller 230. As described above, the travel driving unit 250 may include the left wheel driving motor for rotating the left wheel 36(L) and the right wheel driving motor for rotating the right wheel 36(R).

The cleaning unit 260 may operate a brush to easily suck dust or foreign substances around the mobile robot, and operate a suction device to suck the dust or foreign substances. The cleaning unit 260 may control the operation of the suction fan included in the suction unit 34 that sucks foreign substances such as dust or trash so that the dust may be introduced into the foreign substances collecting box through the suction port.

The obstacle detection unit 100 may include the first pattern irradiation unit (or first pattern emitter) 120, the second pattern irradiation unit (or second pattern emitter) 130, and the image acquiring unit (or image sensor) 140.

The sensor unit 150 may include a plurality of sensors to assist the detection of failure. The sensor unit 150 may sense an obstacle in front of the main body 10, i.e., in the traveling direction, using at least one of a laser, an ultrasonic wave, and an infrared ray. When the transmitted signal is reflected and inputted, the sensor unit 150 may input information on the presence of an obstacle or a distance to the obstacle to the controller 200 as an obstacle detection signal.

In addition, the sensor unit 150 may include at least one tilt sensor to detect the tilt of the main body. The tilt sensor may calculate the tilted direction and angle, when being tilted to the front, rear, left, and right directions of the main body. The tilt sensor may be a tilt sensor, an acceleration sensor, or the like. In the case of the acceleration sensor, any of gyro type, inertial type, and silicon semiconductor type may be used.

As described above, the first pattern irradiation unit 120, the second pattern irradiation unit 130, and the image acquiring unit 140 may be installed in the front of the main body 10 to irradiate light of first and second patterns (P1, P2) to the front of the mobile robot 10, and the obstacle detection unit 100 may acquire an image by photographing light of the irradiated pattern. The obstacle detection unit 100 may input the acquisition image to the controller 200 as an obstacle detection signal.

The first and second pattern irradiation units 120 and 130 of the obstacle detection unit 100 may include a light source, and an optical pattern projection element (OPPE) that generates a certain pattern by transmitting the light irradiated from the light source. The light source may be a laser diode (LD), a light emitting diode (LED), or the like. Laser light may be superior to other light sources in terms of monochromaticity, straightness, and connection characteristics, thereby achieving a precise distance measurement. In particular, the infrared light or visible light may incur variation significantly in the accuracy of the distance measurement depending on factors such as the color and the material of the object. Accordingly, a laser diode is preferable as a light source. The optical pattern projection element (OPPE) may include a lens, and a diffractive optical element (DOE). Various patterns of light may be irradiated according to the configuration of the OPPE included in each of the pattern irradiation units 120 and 130.

The first pattern irradiation unit 120 may irradiate light of the first pattern P1 (hereinafter, referred to as a first pattern light) toward the front lower side of the main body 10. Therefore, the first pattern light P1 may be incident on the floor of the cleaning area.

The first pattern light P1 may be formed in the form of a horizontal line Ph. In addition, it is possible that the first pattern light P1 is formed in the form of a cross pattern in which the horizontal line Ph and a vertical line Pv intersect each other.

The first pattern irradiation unit 120, the second pattern irradiation unit 130, and the image acquiring unit 140 may be vertically arranged in a line. The image acquiring unit 140 may be provided below the first pattern irradiation unit 120 and the second pattern irradiation unit 130. However, the present disclosure is not limited thereto, and the image acquiring unit 140 may be provided above the first pattern irradiation unit 120 and the second pattern irradiation unit 130.

In an embodiment, the first pattern irradiation unit 120 may be located on the upper side and may irradiate the first pattern light P1 downwardly toward the front to detect obstacles located below the first pattern irradiation unit 120. The second pattern irradiation unit 130 may be located below the first pattern irradiation unit 120 and may irradiate light of the second pattern (P2, hereinafter, referred to as a second pattern light) upwardly toward the front. Accordingly, the second pattern light P2 may be emitted to a wall or an obstacle or a certain portion of the obstacle located at least higher than the second pattern irradiation unit 130 from the floor of the cleaning area.

The second pattern light P2 may have a pattern different from that of the first pattern light P1, and preferably may include a horizontal line. Here, the horizontal line is not necessarily a continuous line segment, but may be a dotted line.

Meanwhile, in FIG. 2, the irradiation angle $\theta h$ may indicate a horizontal irradiation angle of the first pattern light P1 irradiated from the first pattern irradiation unit 120, and represent an angle formed between both ends of the horizontal line Ph and the first pattern irradiation unit 120. It is preferable that the irradiation angle is set in the range of 130 degrees to 140 degrees, but is not limited thereto. The dotted line shown in FIG. 2 may be directed toward the front of the mobile robot 1, and the first pattern light P1 may be configured to be symmetrical with respect to the dotted line.

Similarly to the first pattern irradiation unit 120, the horizontal irradiation angle of the second pattern irradiation unit 130 may be defined, preferably, in the range of 130 to 140 degrees. According to an embodiment, the second pattern irradiation unit 130 may irradiate the pattern light P2 at the same horizontal irradiation angle as the first pattern irradiation unit 120. In this case, the second pattern light P2 may also be formed symmetrically with respect to the dotted line shown in FIG. 2.

The image acquiring unit 140 may acquire an image in front of the main body 10. Particularly, the pattern light P1 and P2 may appear in the image acquired by the image acquiring unit 140 (hereinafter, referred to as an acquisition image). Hereinafter, the image of the pattern light P1 and P2 displayed in the acquisition image may be referred to as a light pattern. Since this is substantially an image, formed in an image sensor, of the pattern light P1 and P2 incident on an actual space, the same reference numeral as the pattern light P1 and P2 may be assigned. Thus, the images corresponding to the first pattern light P and the second pattern light P2 respectively may be referred to as a first light pattern P1 and a second light pattern P2.

The image acquiring unit 140 may include a digital camera that converts an image of an object into an electrical signal and then converts into a digital signal to store the digital signal in a memory device. The digital camera may include an image sensor (not shown) and an image processor (not shown).

The image sensor may be an apparatus for converting an optical image into an electrical signal. The image sensor may be composed of a chip on which a plurality of photo diodes are integrated, and the photodiode may be a pixel. Charges may be accumulated in the respective pixels by the image, formed in the chip, of the light passing through a lens. The charges accumulated in the pixel may be converted into an electrical signal (e.g., a voltage). A charge coupled device (CCD) and a complementary metal oxide semiconductor (CMOS) are well known as the image sensor.

The image processing unit may generate a digital image based on the analog signal output from the image sensor. The image processing unit may include an AD converter for converting an analog signal into a digital signal, a buffer memory for temporarily storing digital data according to the digital signal output from the AD converter, and a digital signal processor (DSP) for processing the data stored in the buffer memory and configuring a digital image.

The controller 200 may include the obstacle recognition unit (or obstacle detector) 210, a map generation unit (or map generator) 220, the travel controller 230, and a location recognition unit (or location sensor) 240.

The obstacle recognition unit 210 may determine an obstacle through the acquisition image input from the obstacle detection unit 100. The travel controller 230 may control the travel driving unit 250 to change the moving direction or the traveling route in accordance with obstacle information to pass the obstacle or to avoid the obstacle. The travel controller 230 may control the travel driving unit 250 to independently control the operation of the left and right wheel driving motors so that the main body 10 can travel straight or turn.

The obstacle recognition unit 210 may store an obstacle detection signal input from the sensor unit 150 or the obstacle detection unit 100 in the data unit 280, and analyze the obstacle detection signal to determine an obstacle. The obstacle recognition unit 210 may determine whether there is a forward obstacle based on the signal of the sensor unit, and analyze the acquisition image to determine the location, size, and shape of the obstacle.

The obstacle recognition unit 210 may analyze the acquisition image and extract a pattern. The obstacle recognition unit 210 may extract a light pattern which is generated when the light of the pattern irradiated from the first pattern irradiation unit or the second pattern irradiation unit is irradiated on the floor or the obstacle, and determine an obstacle based on the extracted light pattern.

The obstacle recognition unit 210 may detect the light pattern P1 and P2 from the image (acquisition image) acquired by the image acquiring unit 140. The obstacle recognition unit 210 may detect feature such as point, line, surface, and the like with respect to certain pixels constituting the acquisition image, and detect the light pattern P1 and P2 or the point, line, surface, and the like that constitute the pattern P1 and P2 based on the detected feature.

The obstacle recognition unit 210 may extract lines constituted by successive pixels brighter than the surrounding area, and extract a horizontal line Ph constituting the first light pattern P1 and a horizontal line constituting the second light pattern P2. However, the present disclosure is not limited thereto. Various techniques for extracting a desired pattern from a digital image are already known, and the obstacle recognition unit 210 may extract the first light pattern P1 and the second light pattern P2 by using known techniques.

In addition, the obstacle recognition unit 210 may determine the presence of an obstacle based on the detected pattern, and determine the shape of the obstacle. The obstacle recognition unit 210 may determine an obstacle through the first light pattern and the second light pattern, and calculate the distance to the obstacle. In addition, the obstacle recognition unit 210 may determine the size (height) and the shape of the obstacle through the shape of the first light pattern and the second light pattern, and the change of the light pattern displayed when approaching the obstacle.

The obstacle recognition unit 210 may determine an obstacle based on the distance to a reference location with respect to the first and second patterns. When the first light pattern P1 appears in a location lower than the reference location, the obstacle recognition unit 210 may determine that a downward ramp exists. When the first light pattern P1 disappears, the obstacle recognition unit 210 may determine that there exists a cliff. In addition, when the second light pattern appears, the obstacle recognition unit 210 may determine a forward obstacle or an upper obstacle.

The obstacle recognition unit 210 may determine whether the main body is tilted, based on tilt information input from the tilt sensor of the sensor unit 150. When the main body is tilted, the obstacle recognition unit 210 may compensate the tilt with respect to the location of the light pattern of the acquisition image.

The travel controller 230 may control the travel driving unit 250 to travel in a designated area of the cleaning area and perform cleaning, and control the cleaning unit 260 to perform cleaning by sucking dust while traveling. In response to the obstacle recognized by the obstacle recognition unit 210, the travel controller 230 may determine whether it is possible to travel or to enter, set a travel route to approach the obstacle and travel and control the travel driving unit 250 to pass the obstacle, or avoid the obstacle.

The map generation unit 220 may generate a map of the cleaning area, based on the information of the obstacle determined by the obstacle recognition unit 210. The map generation unit 220 may generate a map for the cleaning area based on the obstacle information while traveling the cleaning area, in the initial operation or when the map for the cleaning area is not stored. In addition, the map generation unit 220 may update a pre-generated map, based on the obstacle information acquired during the traveling.

The map generation unit 220 may generate a basic map based on the information acquired from the obstacle recognition unit 210 during the traveling, and generate a cleaning map by dividing the area from the basic map. In addition, the map generation unit 220 may readjust the area for the cleaning map and set an attribute for the area to generate a user map and a guide map.

The basic map may be a map in which the shape of the cleaning area acquired through traveling is displayed as an outline, and the cleaning map may be a map in which the area is divided in the basic map. The basic map and the cleaning map may include the movable area of the mobile robot and the obstacle information. The user map may be a map which simplifies the area of the cleaning map and readjust and process the shape of the outline, and is added with visual effects. The guide map may be a map in which the cleaning map and the user map are superimposed. Since the cleaning map is displayed in the guide map, a cleaning command may be inputted based on the area where the mobile robot can actually travel.

After generating the basic map, the map generation unit 220 may generate a map by including a connection path for dividing the cleaning area into a plurality of areas and connecting the plurality of areas, and including information on an obstacle in the respective areas. The map generation unit 220 may set a representative area by dividing a small area so as to divide an area on a map, and set the divided small area as a separate detail area to be merged into the representative area, thereby generating a map in which the area is divided.

The map generation unit 220 may process the shape of the area for each of the divided areas. The map generation unit 220 may set an attribute for the divided area, and process the shape of the area according to the attribute for each area. The map generation unit 220 may first determine a main area based on the number of contact points with other areas, in each of the divided areas. The main area may be, basically, a living room, but the main area may be changed to any one of a plurality of rooms in some cases. The map generation unit 220 may set the attribute for the remaining area based on the main area. For example, the map generation unit 220 may set an area of a certain size or more provided based on the living room, which is a main area, as a room, and set the other areas as other area.

The map generation unit 220 may process the shape of the area so that each area may have a specific shape according to a criterion according to the attribute of the area. For example, the map generation unit 220 may process the shape of an area based on a typical family room type, e.g., a square. In addition, the map generation unit 220 may process the shape of an area by expanding the shape of the area based on the outermost cell of the basic map, and deleting or reducing the area with respect to the area that cannot be approached due to an obstacle.

In addition, depending on the size of the obstacle, in the basic map, the map generation unit 220 may display an obstacle having a certain size or larger on the map, and delete a corresponding cell of the obstacle less than a certain size to prevent the obstacle from being displayed. For example, the map generating unit may display furniture such as a chair, a sofa, or the like having a certain size or more on a map, and delete a temporary obstacle, e.g., a small toy from the map. The map generation unit 220 may store the location of a charging stand 59 together with a map when generating the map.

The map generation unit 220 may add an obstacle to the map based on the obstacle information input from the obstacle recognition unit 21, with respect to the detected obstacle, after generating the map. The map generation unit 220 may add an obstacle to the map when a specific obstacle is repeatedly detected at a fixed location, and ignore the obstacle when the obstacle is temporarily detected. The map generation unit 220 may generate both the user map, which is a map of the processed form, and the guide map, which is displayed by superimposing the user map and the cleaning map.

When a virtual wall is set by a terminal 300, the map generation unit 220 may set the location of the virtual wall to the cleaning map based on the data of the virtual wall received through the communication unit, and calculate the coordinate of the virtual wall corresponding to the cleaning area. The map generation unit 220 may register the virtual wall in the cleaning map as an obstacle.

The map generation unit 220 may expand the virtual wall set by the terminal and register it as an obstacle. During the traveling, the map generation unit 220 may expand and set the set virtual wall to a wider range so that the main body 10 may not be in contact with or may not intrude into the virtual wall, preventing the main body 10 from contacting the virtual wall.

When the current location of the main body 10 cannot be determined by the location recognition unit 240, the map generation unit 220 may generate a new map for the cleaning area. The map generation unit 220 may determine that the main body 10 has moved to a new area and initialize a preset virtual wall.

The mobile robot may perform the cleaning based on the cleaning map, and transmit the user map and the guide map to the terminal. The terminal 300 may store both the guide map and the user map to display on the screen, and output one of them according to the setting. When a cleaning command based on the user map or the guide map is input from the terminal 300, the mobile robot 1 may travel based on the cleaning map and clean a designated area. The location recognition unit 240 may determine the current location of the main body 10 based on the map (cleaning map, guide map, or user map) stored in the data unit.

When the cleaning command is input, the location recognition unit 240 may determine whether the location on the map is coincident with the current location of the main body 10. When the current location is not coincident with the location on the map or when the current location cannot be checked, the location recognition unit 240 may recognize the current location and restore the current location of the mobile robot 1. When the current location is restored, the travel controller 230 may control the travel driving unit to move to a designated area based on the current location. The cleaning command may be input from a remote controller (not shown), the operation unit 160, or the terminal 300.

When the current location is not coincident with the location on the map or when the current location cannot be checked, the location recognition unit 240 may analyze the acquisition image input from the image acquiring unit 140 and estimate the current location based on the map. The location recognition unit 240 may process the acquisition image acquired at each location during the map generation by the map generation unit 220, and recognize the whole area location of the main body in association with the map.

The location recognition unit 240 may determine the current location of the main body by comparing the map with the acquisition image of each location on the map by using the acquisition image of the image acquiring unit 140, so that the current location can be estimated and recognized even when the location of the main body is suddenly changed.

The location recognition unit 240 may analyze various features included in the acquisition image, such as ceiling lights, edge, corner, blob, ridge, or the like. The acquisition image may be input from the image acquiring unit or a second image acquiring unit provided at an upper end of the main body.

The location recognition unit 240 may detect the feature from each of the acquisition images. Various methods for detecting features from an image in the field of Computer Vision are well known. Several feature detectors suitable for detecting these features are known, such as Canny, Sobel, Harris&Stephens/Plessey, SUSAN, Shi&Tomasi, Level curve curvature, FAST, Laplacian of Gaussian, Difference of Gaussians, Determinant of Hessian, MSER, PCBR and Gray-level blobs detector, and the like.

The location recognition unit 240 may calculate a descriptor based on each feature point. The location recognition unit 240 may convert the feature point into a descriptor by using a Scale Invariant Feature Transform (SIFT) technique for feature detection. The descriptor may be denoted by an n-dimensional vector. SIFT may detect an unchanging feature with respect to the scale, rotation, and brightness change of a subject of photograph. Even if the same area is photographed with a different posture of the mobile robot 1, the unchanging (Rotation-invariant) feature can be detected. Obviously, the present disclosure is not limited thereto, and various other techniques (for example, HOG: Histogram of Oriented Gradient, Haar feature, Fems, Local Binary Pattern (LBP), and Modified Census Transform (MCT)) may be applied.

The location recognition unit 240 may classify at least one descriptor for each acquisition image into a plurality of groups according to a certain sub-classification rule, based on descriptor information acquired through the acquisition image of each location, and may convert the descriptors included in the same group into sub-representative descriptors respectively according to a certain sub-representative rule. For another example, it is also possible to classify all descriptors gathered from acquisition images in a certain area, such as a room, into a plurality of groups according to a certain sub-classification rule, and may convert the descriptors included in the same group into sub-representative descriptors respectively according to a certain sub-representative rule.

The location recognition unit 240 may obtain the feature distribution of each location through such a process. Each location feature distribution may be represented by a histogram or an n-dimensional vector. As another example, the location recognition unit 240 may estimate an unknown current location based on the descriptor calculated from each feature point, without going through a certain sub-classification rule and a certain sub-representative rule. In addition, when the current location of the mobile robot 1 is in an unknown state due to a location leap or the like, the location recognition unit 240 may estimate the current location based on data such as a pre-stored descriptor, a sub-representative descriptor, or the like.

The location recognition unit 240 may acquire the acquisition image through the image acquiring unit 140 at an unknown current location, and detect features from the acquisition image, when various features, such as lights located on the ceiling, an edge, a corner, a blob, a ridge, etc., are checked through the image.

The location recognition unit 240 may convert into location information (e.g., feature distribution of each location) to be compared in accordance with a certain sub-transformation rule and comparable information (sub-recognition feature distribution), based on at least one recognition descriptor information acquired through the acquisition image of an unknown current location. According to a certain sub-comparison rule, each location feature distribution may be compared with each recognition feature distribution to calculate each similarity. The similarity (probability) may be calculated according to the above mentioned location corresponding to each location, and the location where the greatest probability is calculated may be determined as the current location.

When the map is updated by the map generation unit 220 during the traveling, the controller 200 may transmit the updated information to the terminal 300 through the communication unit so that the map stored in the terminal and the mobile robot 1 can be the same. Accordingly, as the map stored in the terminal 300 and the mobile robot 1 is maintained to be the same, the mobile robot 1 may clean the designated area in response to the cleaning command from the terminal. In addition, the terminal may display the current location of the mobile robot on the map.

When the cleaning command is inputted, the travel controller 230 may control the travel driving unit to move to the designated area of the cleaning area, and operate the cleaning unit to perform the cleaning together with the traveling. When a cleaning command for a plurality of areas is inputted, the travel controller 230 may move to the area according to the setting of priority area or the designated order so that the cleaning can be performed. When a separate cleaning order is not specified, the travel controller 230 may move to, based on the current location, a near area or an adjacent area according to the distance and perform cleaning.

In addition, when a cleaning command for an arbitrary area is input regardless of the area division, the travel controller 230 may move to an area included in the arbitrary area and perform cleaning. When the virtual wall is set, the travel controller 230 may control the travel driving unit to avoid the virtual wall, based on the coordinate value input from the map generation unit 220. Even if it is determined by the obstacle recognition unit 210 that the obstacle does not exist, the travel controller 230 may recognize that an obstacle exists at a corresponding location and restrict the traveling when the virtual wall is set.

When the cleaning of the set designated area is completed, the controller 200 may store a cleaning record in the data unit. In addition, the controller 200 may transmit the operation state or the cleaning state of the mobile robot 1 to the terminal 300 through the communication unit 190 at certain intervals.

Based on the data received from the mobile robot 1, the terminal 300 may display the location of the mobile robot together with the map on the screen of the application being executed, and also output information on the cleaning state. The terminal 300 may display either the user map or the guide map on the screen according to the setting, and may change and display the map through the setting.

The terminal 300 may display the received map on the screen, and may change the area by separating or merging the area through a key input or touch input, and may set the attribute of the area by changing or adding the attribute of the area. In addition, the terminal may specify a location on the map for a specific obstacle, and information on a designated obstacle may be transmitted to the mobile robot and added to a pre-stored map.

The terminal 300 may designate a cleaning area corresponding to a key input or a touch input with respect to the displayed map, set a cleaning order, and transmit a cleaning command to the mobile robot. In addition, the terminal 300 may display the cleaning state on the displayed map (user map and guide map), based on the data received from the mobile robot. When information on an obstacle is added, the terminal may update and display the map based on the received data.

In addition, when a charging stand 59 is detected through a return signal of the charging stand, the controller 200 may recognize the current location of the mobile robot, and calculate and store the location of the charging stand based on the current location of the mobile robot. The controller 200 may set the location of the charging stand to be displayed on the map.

Figure 6:
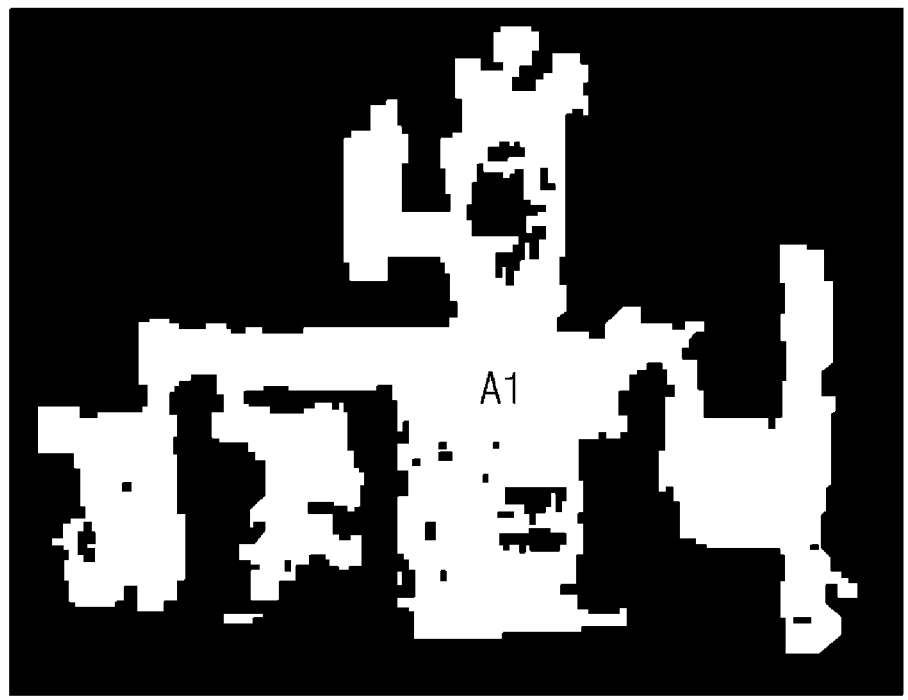
FIG. 6 and FIG. 7 are a diagram for explaining a method of generating a map by a mobile robot according to an embodiment of the present disclosure.
Figure 6:
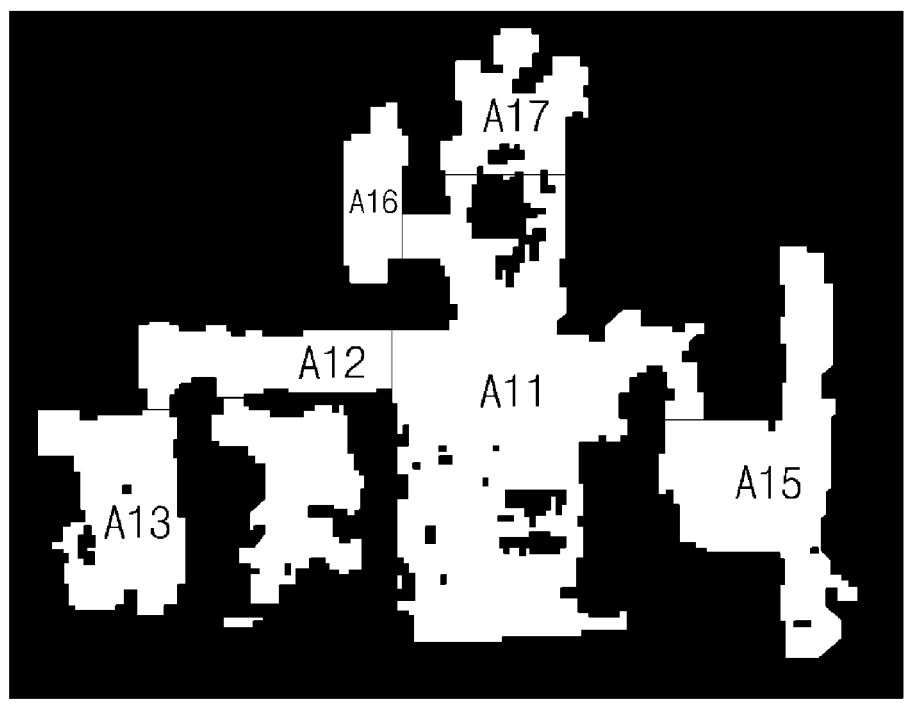
Figure 7:
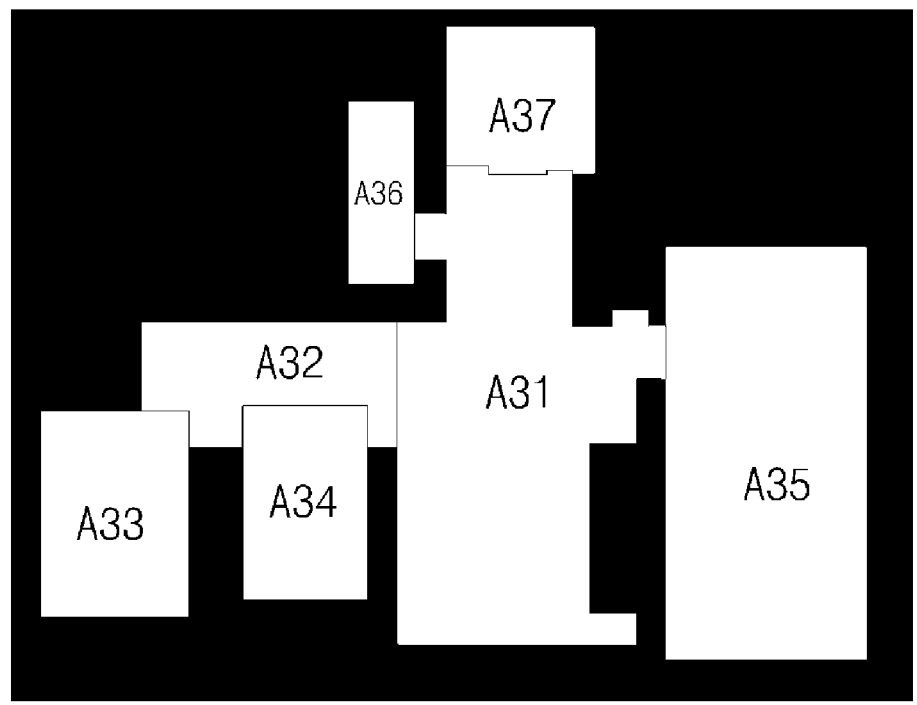
Figure 7:
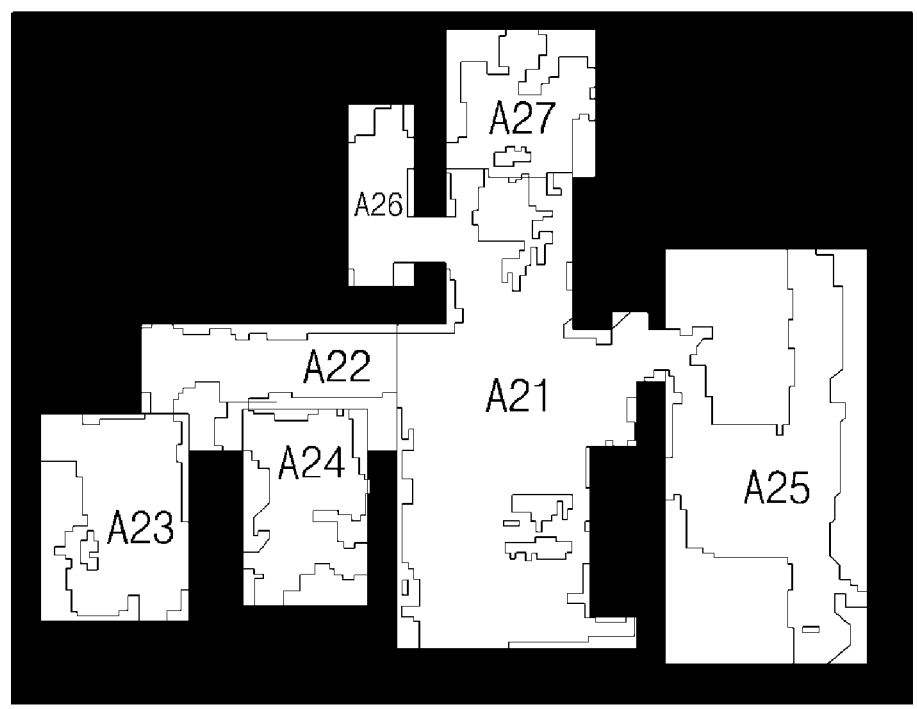

FIG. 6 and FIG. 7 are a diagram for explaining a method of generating a map by a mobile robot according to an embodiment of the present disclosure. As shown in FIG. 6, when a map is not stored or an initial operation is performed, the mobile robot 1 may travel in a cleaning area through wall following or the like to generate a map. In addition, the mobile robot 1 may perform cleaning for a cleaning area without a map, and may generate a map through acquired obstacle information.

As shown in section A of FIG. 6, during the traveling, the map generation unit 220 may generate a map, based on the map data input from the obstacle detection unit 100 and the sensor unit 150 and the obstacle information of the obstacle recognition unit 210.

The map generation unit 220 may generate a basic map A1 composed of a outline for the cleaning area through wall following. Since the basic map is implemented in the form of an outline for the entire area, the area is not divided. As shown in section B of FIG. 6, the map generation unit 220 may divide the basic map A1 into a plurality of areas A11 to A17, and generate a cleaning map, i.e., a map in which the area is divided.

The map generation unit 220 may separate a small area of a certain size or smaller from the base map A1 and set a representative area of a certain size or larger. The map generation unit 220 may set a representative area by a separating small area by the erosion and dilation of the basic map through morphology operation. The map generation unit 220 may set a certain type of constituent element to the image to be processed, i.e., a basic map, perform an erosion operation by completely including the constituent element in the area of the image, and may perform a dilation operation by including a part of the constituent element in the area of the image. According to the setting of the constituent element as well as the image area, the form of erosion and dilation may be changed.

The map generation unit 220 may set a detail area for the remaining small area subtracting the representative area. Since the detail area is an area connecting the representative area or an area attached to the representative area, the map generation part 220 may reset the area by merging each detail area into any one representative area. The map generation unit 220 may merge the detail area into any one representative area, based on the association such as the connection with each representative area, the number of connection point (node), distance, and the like. In addition, when the detail area B is a certain size or larger, the map generation unit 220 may set the detail area as a separate area.

Accordingly, the map generation unit 220 may merge the detail area into the representative area, thereby generating a clean map in which the area is divided. The map generation unit 220 may divide a plurality of areas by merging the detail area into the representative area, and then set a main area, a room, and other area corresponding to the number of contact points where each representative area contacts with the other area and the size of the area. It is illustrated that the main area is set as a living room.

In addition, the map generation unit 220 may set attribute for a plurality of areas, based on the main area. The map generation unit 220 may set the remaining area excluding the main area as a room or other area according to its size or shape.

As shown in section A of FIG. 7, the map generation unit 220 may generate a cleaning map, and then process the shape of the area so that the user can easily recognize the area. The map generation unit 220 may simplify the shape of the area, arrange a small area or an obstacle, and expand or delete the area. The map generation unit 220 may process the shape of the area in a certain shape according to the attribute of the area. For example, the map generation unit 220 may process a room into a square shape.

The map generation unit 220 may generate a user map by processing the shape of the area from the cleaning map. The map generation unit 220 may process the map in a specific shape according to the attribute of the area, and modify the shape of the area according to the size of the obstacle.

When the obstacle is located in the area, based on the outermost line, the map generation unit 220 may process the shape of the area to change the area of the map so that the obstacle can be included in the area. In addition, when the obstacle has a certain size or larger, the map generation unit 220 may reduce or delete a corresponding area to change the area of the map with respect to the area which the mobile robot cannot approach due to an obstacle. Further, when the obstacle has a certain size or larger, the map generation unit 220 may display the obstacle on the map, and may delete the obstacle from the map when the obstacle is smaller than a certain size.

The map generation unit 220 may process the shape of the area on a different basis according to the attribute of the area. When the area is a room, the map generation unit 220 may process the shape of the area into a rectangular shape. Since a plurality of obstacles exist in the living room which is a main area, the map generation unit 220 may process the shape of the area, corresponding to an outline and a small obstacle, in the form of a polygon. The map generation unit 220 may process the shape of the area so that the outline of the area may become a straight line, in consideration of the size of the obstacle.

The map generation unit 220 may generate a user map composed of a plurality of areas A31 to A37 by applying the visual effect, after processing the area shape. In the user map, a plurality of areas may be displayed in different colors, and the name for each area may be displayed. In the user map, the area of the same attribute may be displayed in the same color according to the attribute of the area. In addition, information on a specific obstacle may be displayed in the user map in the form of an image, an icon, an emoticon, a special character, and the like. In addition, the map generation unit 220 may set the plurality of areas A31 to A37 of the user map to have a specific shape according to the attribute of the area, and may subdivide one area and set other area as shown in FIG. 8.

As shown in section B of FIG. 7, the map generation unit 220 may generate a guide map, including a plurality of areas A21 to A27, in which the cleaning map and the user map are superimposed and displayed. The guide map may be displayed while the small obstacle of the cleaning map is removed.

The mobile robot 1 may store the generated map, i.e., the cleaning map, the guide map, and the user map in the data unit 280, and transmit the user map and the guide map to an external device such as a remote controller, the terminal 300, a controller, and the like.

Figure 8:
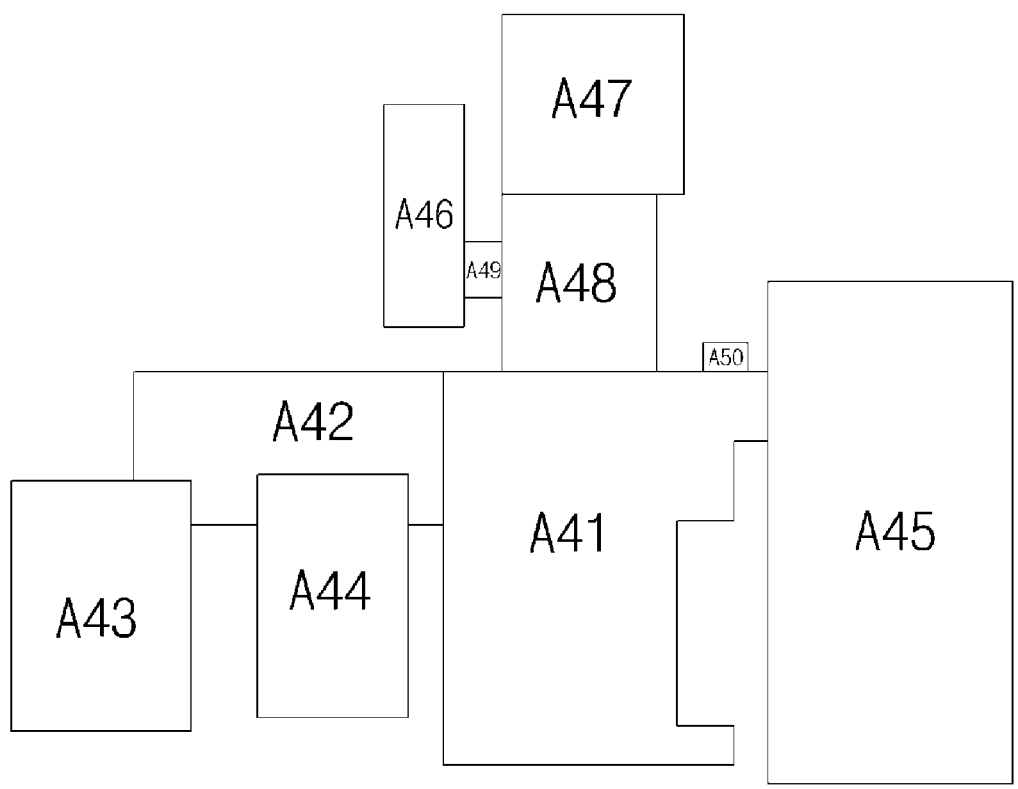
FIG. 8 and FIG. 9 are a diagram illustrating an example of a generated map, in a mobile robot according to an embodiment of the present disclosure.
Figure 9:
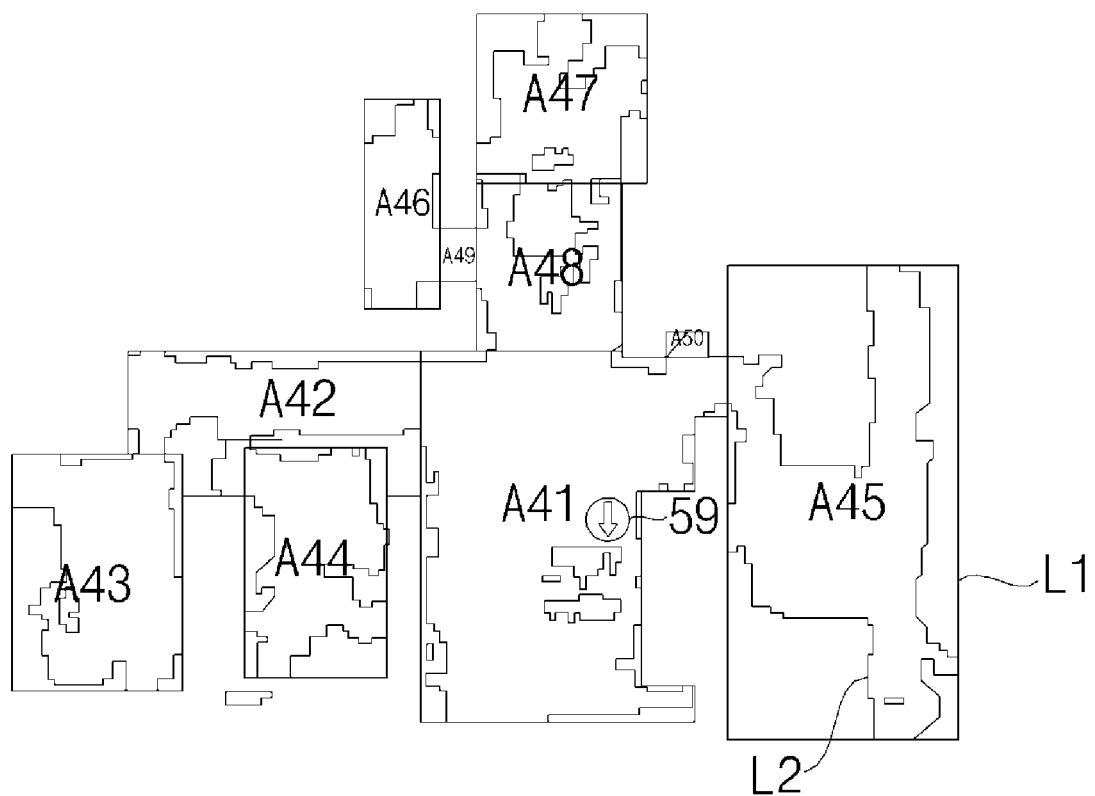

FIG. 8 and FIG. 9 are a diagram illustrating an example of a generated map, in a mobile robot according to an embodiment of the present disclosure. As shown in FIG. 8 and FIG. 9, the terminal 300 may execute a program or an application for controlling the mobile robot 1, and display the received and stored map, i.e., the user map or the guide map on the screen.

A plurality of divided areas A41 to A50 may be displayed differently in the user map or the guide map, and the color may be displayed or the name of the area may be displayed according to the attribute of the area. Further, the attribute of the area may be displayed, and the area of the same attribute may be displayed with the same color. As shown in the drawing, in the user map of FIG. 7A described above, the area may be subdivided and other area may be further set and, further, the area may be modified by the terminal 300.

The terminal 300 may display a map such as the user map in FIG. 8 or the guide map in FIG. 9, display the location of the obstacle on the map, and display an image, an icon, an emoticon, etc of the obstacle depending on the type of the obstacle. The terminal 300 display an icon of charging stand 59 on the map.

When a cleaning command is input with respect to the displayed user map or guide map, the terminal 300 may transmit the input cleaning command to the mobile robot 1. Then, the mobile robot may move to a designated area according to the received cleaning command, and perform cleaning based on the cleaning map. The mobile robot (1) may match the cleaning command inputted based on the user map or the guide map to the cleaning map and determine a designated area.

The mobile robot 1 and the terminal 300 may store the same map, and when the map is changed at one side, the changed data may be transmitted to the other side so that the map can be updated.

Figure 10:
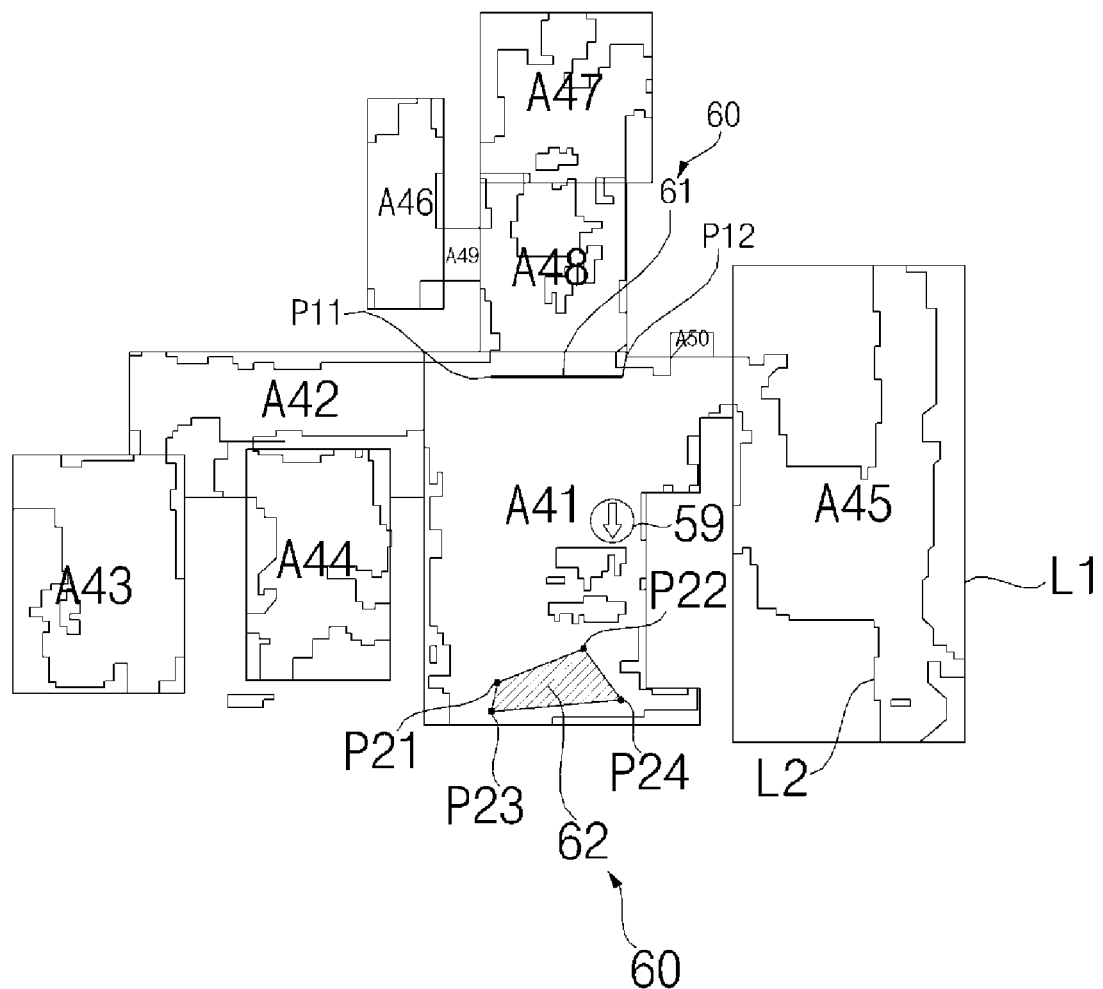
FIG. 10 is a diagram illustrating an example of a virtual wall setting according to an embodiment of the present disclosure.

FIG. 10 is a diagram illustrating an example of a virtual wall setting according to an embodiment of the present disclosure. As shown in FIG. 10, the terminal 300 may display the map received from the mobile robot 1 on the screen. The terminal 300 may include a data unit for storing a program or an application for controlling the mobile robot, and a received data, an input unit including a key input unit or a touch input unit, and a display unit for displaying data. The terminal may include a touch screen having a mutual layer structure of the touch input unit and the display unit.

A plurality of areas A41 to A50 may be separately displayed in the guide map, and the outline L1 of the user map and the outline L2 of the cleaning map may be superimposed and displayed.

The terminal 300 may set a virtual wall on the map displayed on the screen, i.e., on the guide map, in response to the user input. Although the terminal 300 can set a virtual wall on the user map, it is preferable to set the virtual wall 60 on the guide map in which the area where the mobile robot can travel is displayed. The terminal 300 may set a line-shaped first virtual wall 61 connecting an eleventh point P11 and a twelfth point P12, in response to the user input.

In addition, the terminal 300 may set a second virtual wall 62 of a polygon connecting 21st to 24th points (P21 to P24), in response to the user input. The terminal 300 may set the wall 60 according to the number of points to be touched, the number of touches, the direction to be dragged, and the shape to be dragged, with respect to the touch for a specific point, the drag after touch, and the multi touch, in response to the user input, e.g., a touch input.

The virtual wall 60 may be set in the form of a point, a line, and a surface, and the surface may be set in a polygonal shape, a circular shape, or a free shape (e.g., heart, star). As shown in the drawing, when the virtual wall 60, 61 and 62 is set in the guide map, the terminal 300 may transmit data of the virtual wall to the mobile robot 1.

The mobile robot 1 may match the received virtual wall data to the cleaning map, determine the location of the virtual wall, and set the virtual wall such that an obstacle exists at a corresponding location. The mobile robot 1 may calculate the location of the virtual wall as coordinates and determine the location on the map and the location the actual cleaning area to set the virtual wall. The mobile robot 1 may set the virtual wall in a range wider than the data of the received virtual wall.

The mobile robot 1 may recognize the virtual wall 60 as an obstacle even if a physical obstacle is not located, during the traveling. The mobile robot (1) may not approach the virtual wall (60), but may avoid the virtual wall (60).

As the first virtual wall 61 is set as shown, the mobile robot 1 may not move to 46th to 48th areas A46 to A48. In addition, due to the second virtual wall 62, the mobile robot 1 may not approach the area of the second virtual wall 62 with respect to the living room A41 which is the main area, but may travel in other area to perform cleaning.

Figure 11:
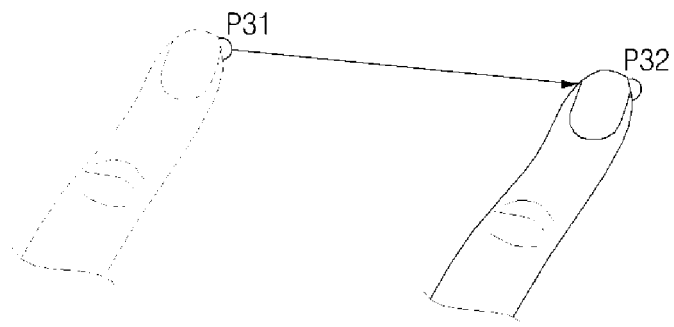
FIG. 11 is a diagram for explaining a method of setting a virtual wall in the form of a line according to an embodiment of the present disclosure.
Figure 11:
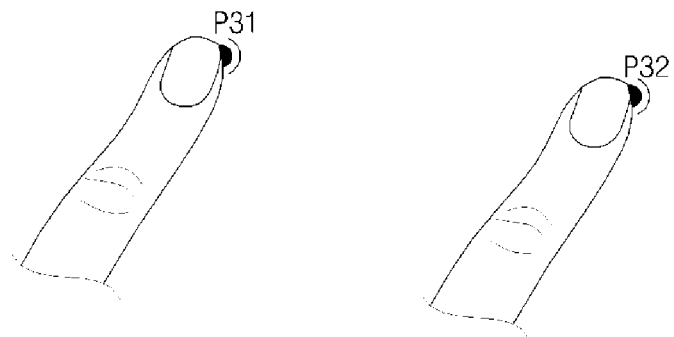
Figure 11:
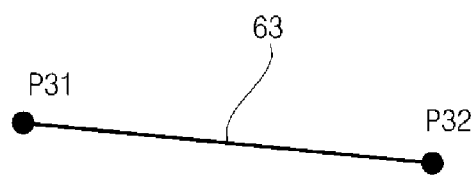
Figure 13:
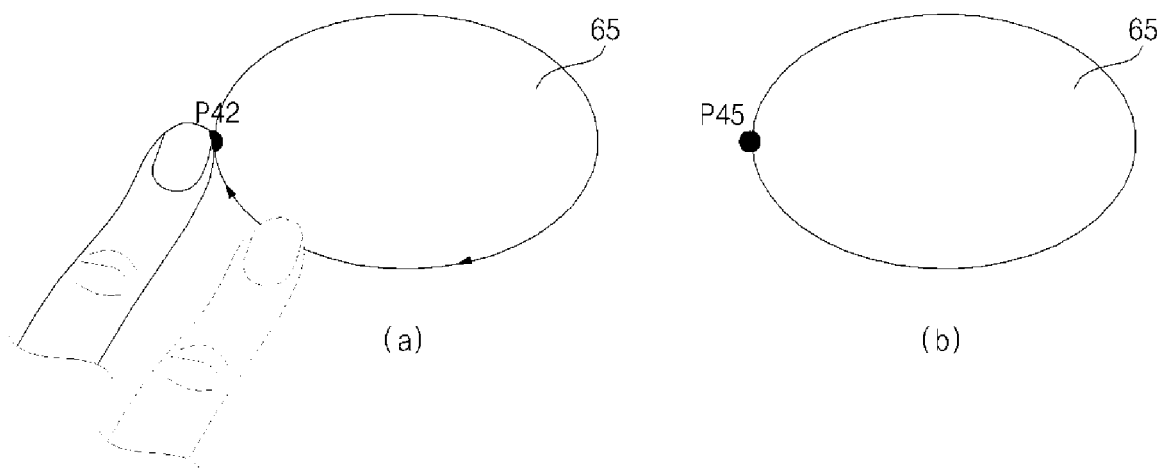
FIG. 13 is a diagram for explaining a method of setting a circular virtual wall according to an embodiment of the present disclosure.
Figure 14:
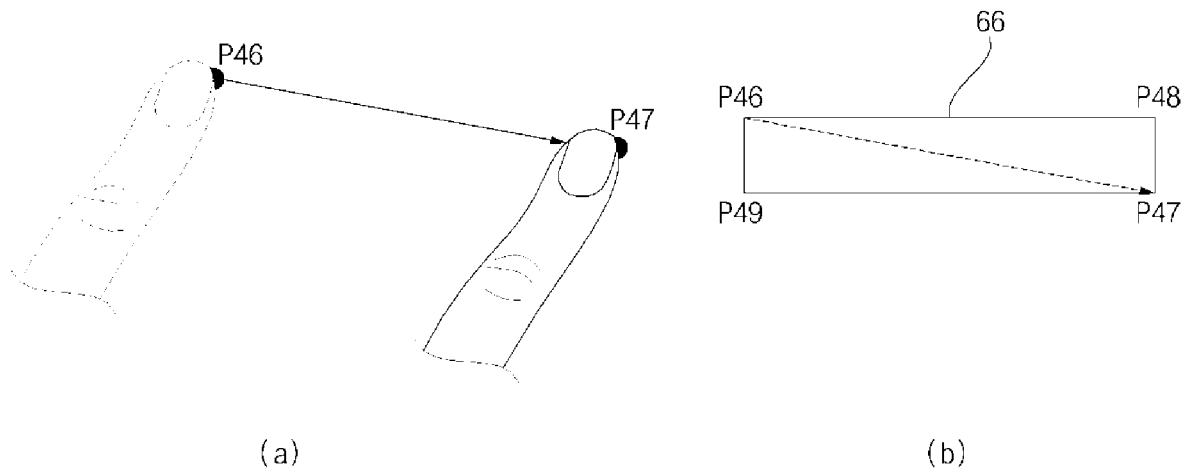
FIG. 14 is a diagram for explaining a method of setting a virtual wall through drag according to an embodiment of the present disclosure.
Figure 15:
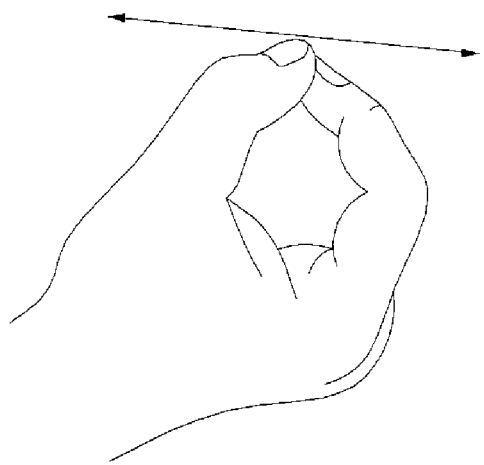
FIG. 15 is a diagram for explaining a method of setting a virtual wall through multi-touch according to an embodiment of the present disclosure.
Figure 15:
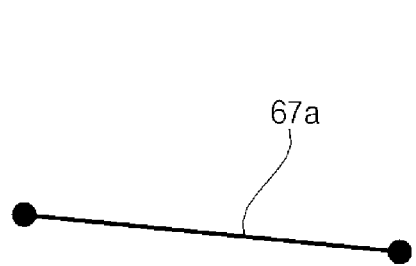
Figure 15:
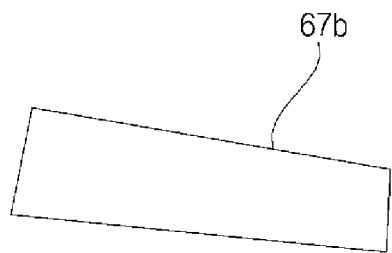

The terminal 300 may set the virtual wall in response to the user input as follows. FIG. 11 is a diagram for explaining a method of setting a virtual wall in the form of a line according to an embodiment of the present disclosure, FIG. 12 is a diagram for explaining a method of setting a virtual wall as an area according to an embodiment of the present disclosure, FIG. 13 is a diagram for explaining a method of setting a circular virtual wall according to an embodiment of the present disclosure, FIG. 14 is a diagram for explaining a method of setting a virtual wall through drag according to an embodiment of the present disclosure, and FIG. 15 is a diagram for explaining a method of setting a virtual wall through multi-touch according to an embodiment of the present disclosure.

As shown in section A of FIG. 11, when a user drags on the screen to a 32nd point P32, after touching a 31st point P31, when the guide map is displayed on the screen, the terminal 300 may set a third virtual wall 63 in a line shape connecting the 31st point P31 and the 32nd point P32 as shown in section C of FIG. 11. When the dragging is achieved in a curve form from the 31st point to the 32nd point, the terminal 300 may set a curved virtual wall.

As shown in section B of FIG. 11, when the user touches the 32nd point P32 on the screen, after touching the 31st point P31, when the guide map is displayed on the screen, the terminal 300 may set the third virtual wall 63 in a line shape connecting the 31st point P31 and the 32nd point P32 as shown in FIG. 11C.

Figure 12:
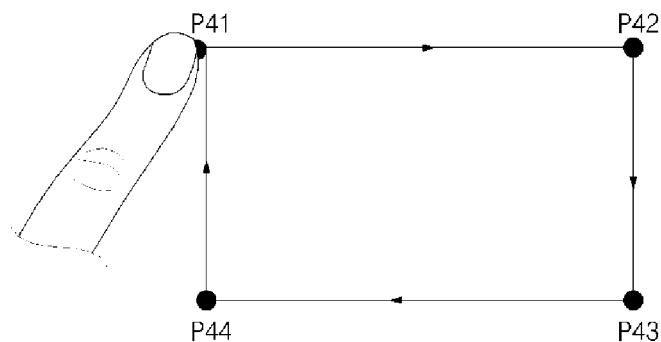
FIG. 12 is a diagram for explaining a method of setting a virtual wall as an area according to an embodiment of the present disclosure.
Figure 12:
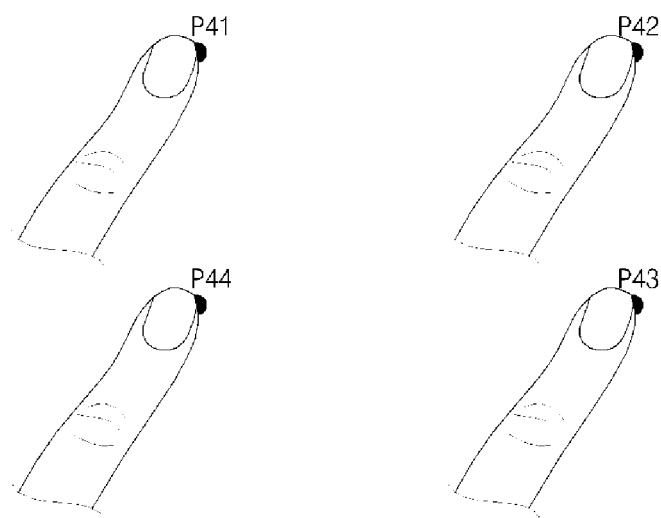
Figure 12:
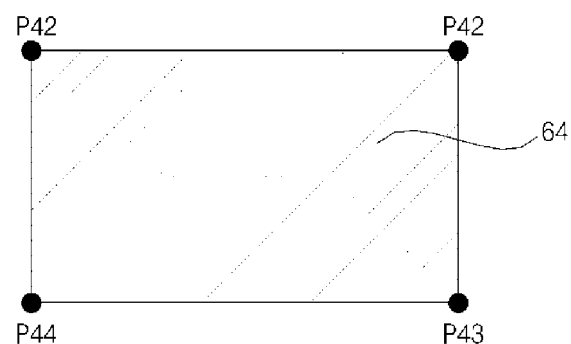

As shown in section A of FIG. 12, when the user drags to a 42nd point P42 after touching a 41st point P41, change the direction to drag to a 43rd point P43, change the direction again to drag to a 44th point P44, and then change the direction to drag to the 41st point P41, the terminal 300 may set a fourth virtual wall 64 according to the dragged shape Accordingly, a rectangular virtual wall may be set on the map as shown in FIG. 12C. In addition, when the 41st to 44th points P41 to P44 are touched respectively as shown in section B of FIG. 12, the terminal 300 may connect the touched points, and may set the fourth virtual wall 64 of a rectangular shape as shown in section C of FIG. 12. The terminal 300 may connect a plurality of touched points in response to the touch input, or set a virtual wall on the map according to the dragged direction after the touch.

As shown in section A of FIG. 13, when dragging is achieved in a circular shape after the 45th point P45 is touched in response to the touch input, the terminal 300 may set a circular virtual wall 65 as shown in section B of FIG. 13. The terminal 300 may set not only a circular virtual wall but also an elliptical virtual wall, and may set a virtual wall of free shape according to the dragged direction.

As shown in section A of FIG. 14, when the user drags to a 47th point P47 after touching a 46th point P46, the terminal 300 may set a virtual wall 66 having a rectangular shape, when the 46th point (P46) and the 47th point (P47) are a diagonal corner as shown in section B of FIG. 14. The terminal 300 may set different types of virtual walls which are generated through a touch method or a menu setting in order to distinguish from the virtual wall of line shape of FIG. 11 described above. For example, the terminal 300 may set a virtual wall in the form of line when dragging is achieved after the touch is performed once, and may set a rectangular virtual wall in which the dragged direction is diagonal when dragging is achieved after the touch is performed twice. In addition, the terminal 300 may previously designate the shape of the virtual wall that is generated according to the touch form through a menu setting.

As shown in section A of FIG. 15, when inputting a multi-touch, according to the multi-touch direction, the terminal 300 may set a line-shaped virtual wall 67a as shown in section B of FIG. 15 or set a rectangular virtual wall 67b as shown in section C of FIG. 15.

Figure 16:
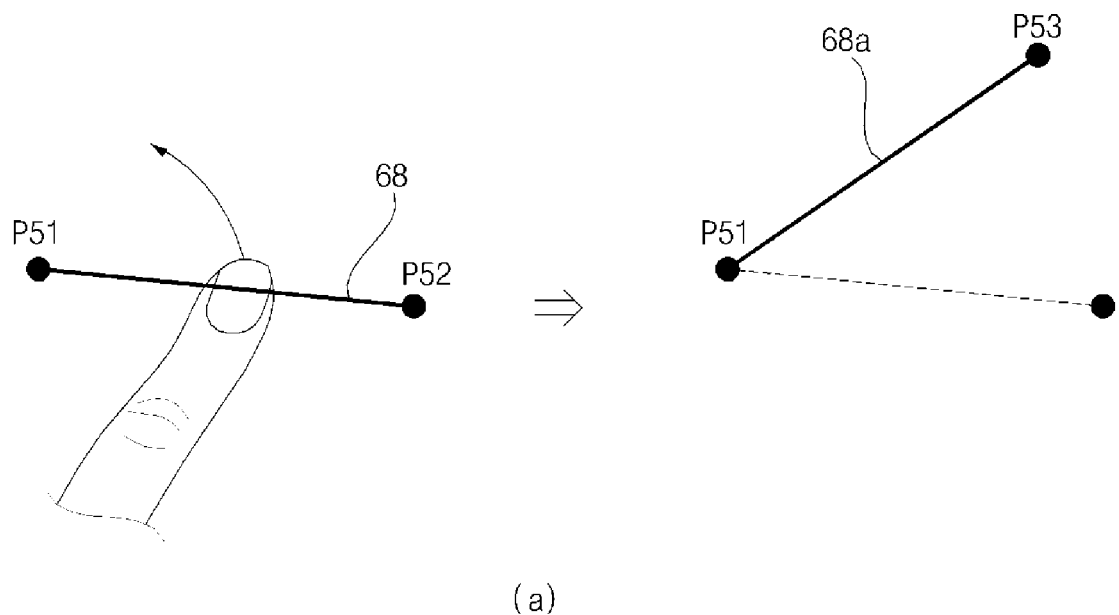
FIG. 16 is a diagram for explaining a virtual wall moving mobile robot system of an embodiment of the present disclosure.
Figure 16:
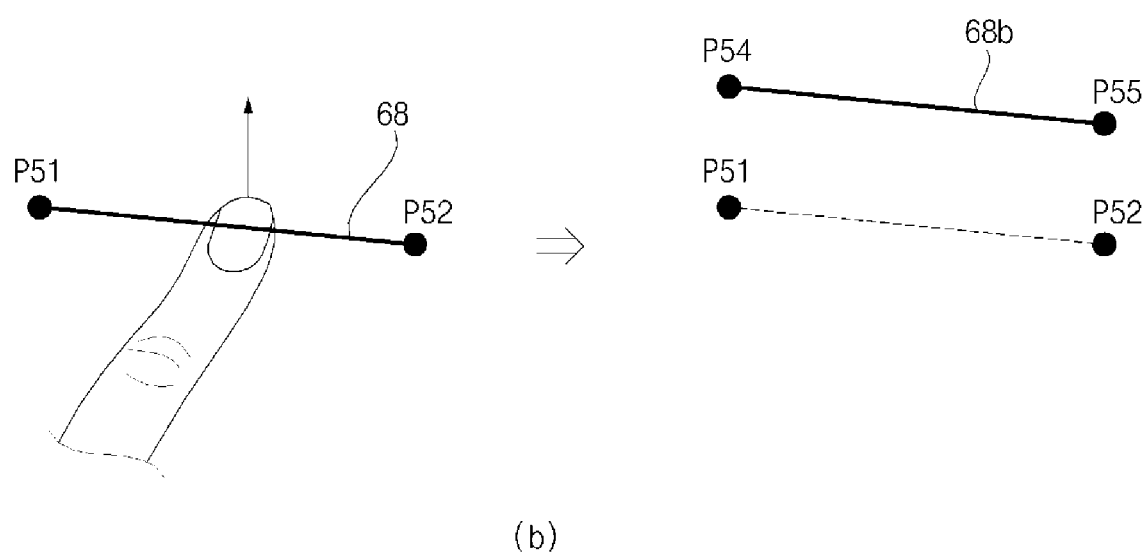

FIG. 16 is a diagram for explaining a virtual wall moving mobile robot system of an embodiment of the present disclosure. As shown in FIG. 16, the terminal 300 may move the location of a preset virtual wall 60 on the map.

As shown in section A of FIG. 16, when a 52nd point P52 is touched and dragged to the left upward in the state in which an eighth virtual wall 68 of a line shape between a 51st point P51 and the 52nd point P52 is set, the terminal 300 may move a right vertex of the eighth virtual wall 68 located at the 52nd point P52 in the dragged direction, and change the virtual wall 68 into a virtual wall 68a connecting the 51st point P51 and a 53st point P53.

In addition, as shown in section B of FIG. 16, in a state in which the eighth virtual wall 68 between the 51st point P51 and the 52nd point P52 is set, when the eighth virtual wall 68 is dragged to any one of the upper, lower, left, or right sides, after any one portion of the line excluding any one side, the left vertex, and the right vertex is touched, the terminal 300 may change the location of the virtual wall 68b as the eighth virtual wall 68 is moved according to the dragged direction.

Figure 17:
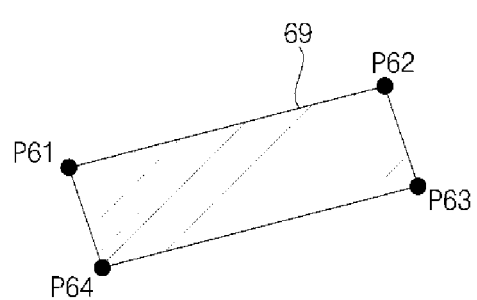
FIG. 17 is a diagram for explaining a virtual wall changing mobile robot system of an embodiment of the present disclosure.
Figure 17:
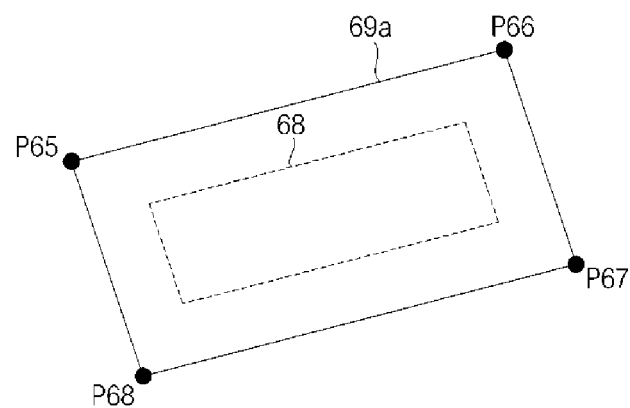
Figure 17:
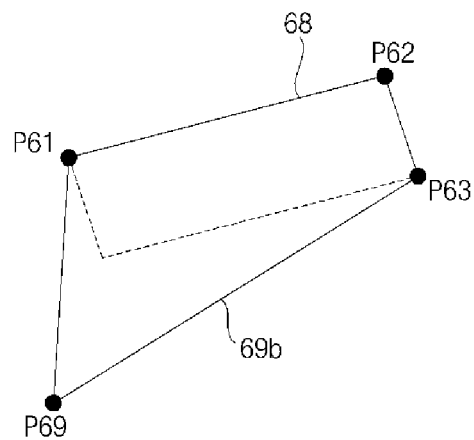
Figure 17:
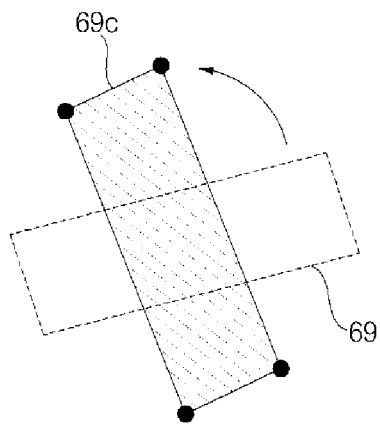

FIG. 17 is a diagram for explaining a virtual wall changing mobile robot system of an embodiment of the present disclosure. The terminal 300 may change a shape of a preset ninth virtual wall 69.

As shown in section A of FIG. 17, in the state where the ninth virtual wall 69 having a rectangular shape connecting a 61st point to a 64th point (P61 to P64) is set, the terminal 300 may change the shape of the virtual wall in response to the touch input.

As shown in section B of FIG. 17, when the ninth virtual wall is multi-touched after the ninth virtual wall 69 is touched once and selected, the terminal 300 may expand or reduce the size of the ninth virtual wall according to the multi-touched and dragged direction. For example, when the distance between the touched points is increased at the time of multi-touch, the terminal 300 may expand the ninth virtual wall to display the expanded ninth virtual wall 69a. When the distance between the two multi-touched points is decreased, the terminal 300 may reduce the ninth virtual wall to display the reduced virtual wall.

As shown in section C of FIG. 17, when any one of 61st to 64th points P61 to P64 of the ninth virtual wall 69, e.g., the 64th point P64, is touched and selected and then dragged in the left downward direction, the terminal 300 may move the vertex of the ninth virtual wall in the dragged direction, and change the virtual wall 69b to be a polygon that connects the points 61, 62, 63, and 69 (P61, P62, P63, and P69)

In addition, as shown in section D of FIG. 17, when the ninth virtual wall 69 is touched and selected and then dragged in any one of the upper left, upper right, lower left, and lower right directions, the terminal 300 may rotate and change the virtual wall 69c based on a pivot point. The terminal 300 may transmit the data of the virtual wall to the mobile robot 1, when the virtual wall is set as described above, or the location or shape of a preset virtual wall is changed.

Figure 18:
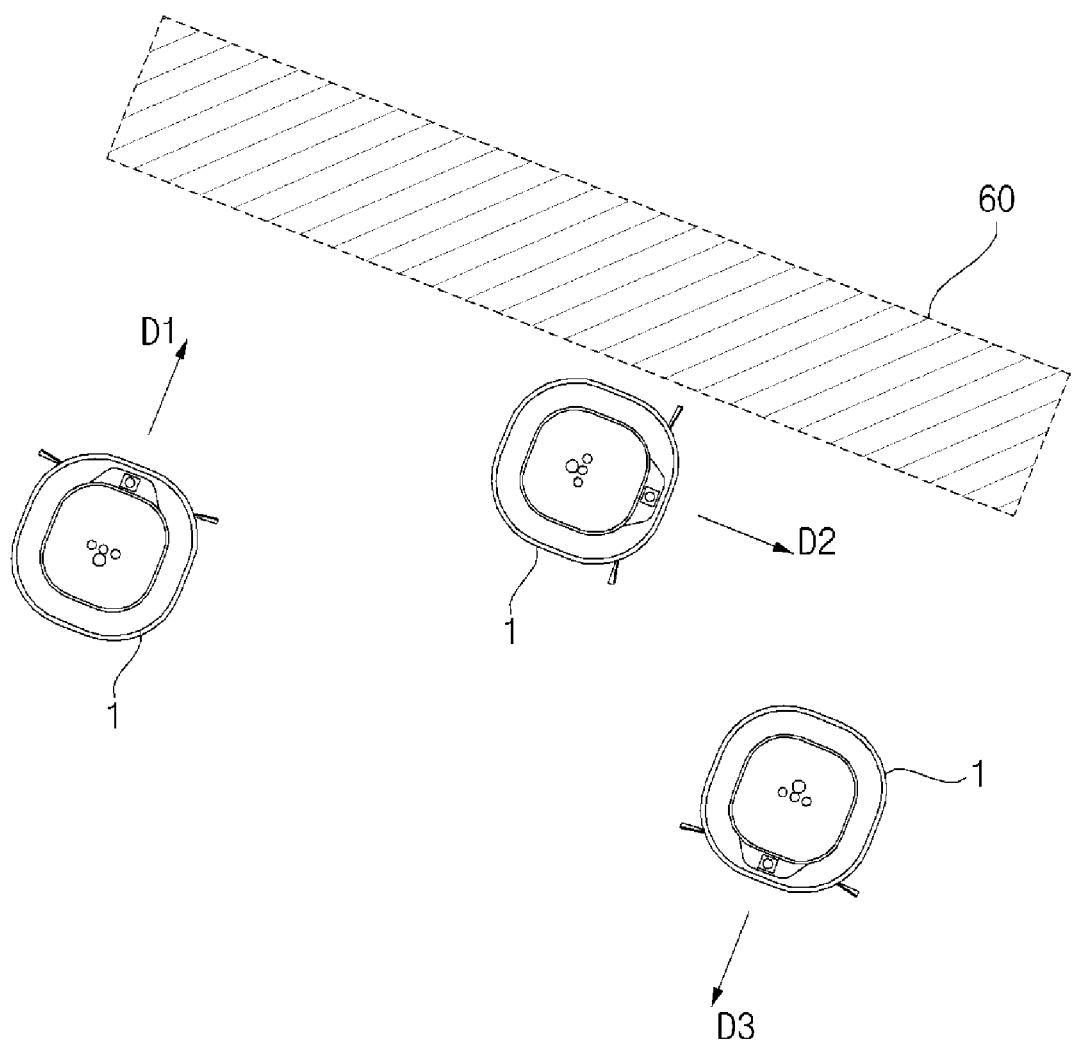
FIG. 18 and FIG. 19 are a diagram for explaining traveling of a mobile robot, when a virtual wall is set according to an embodiment of the present disclosure.
Figure 19:
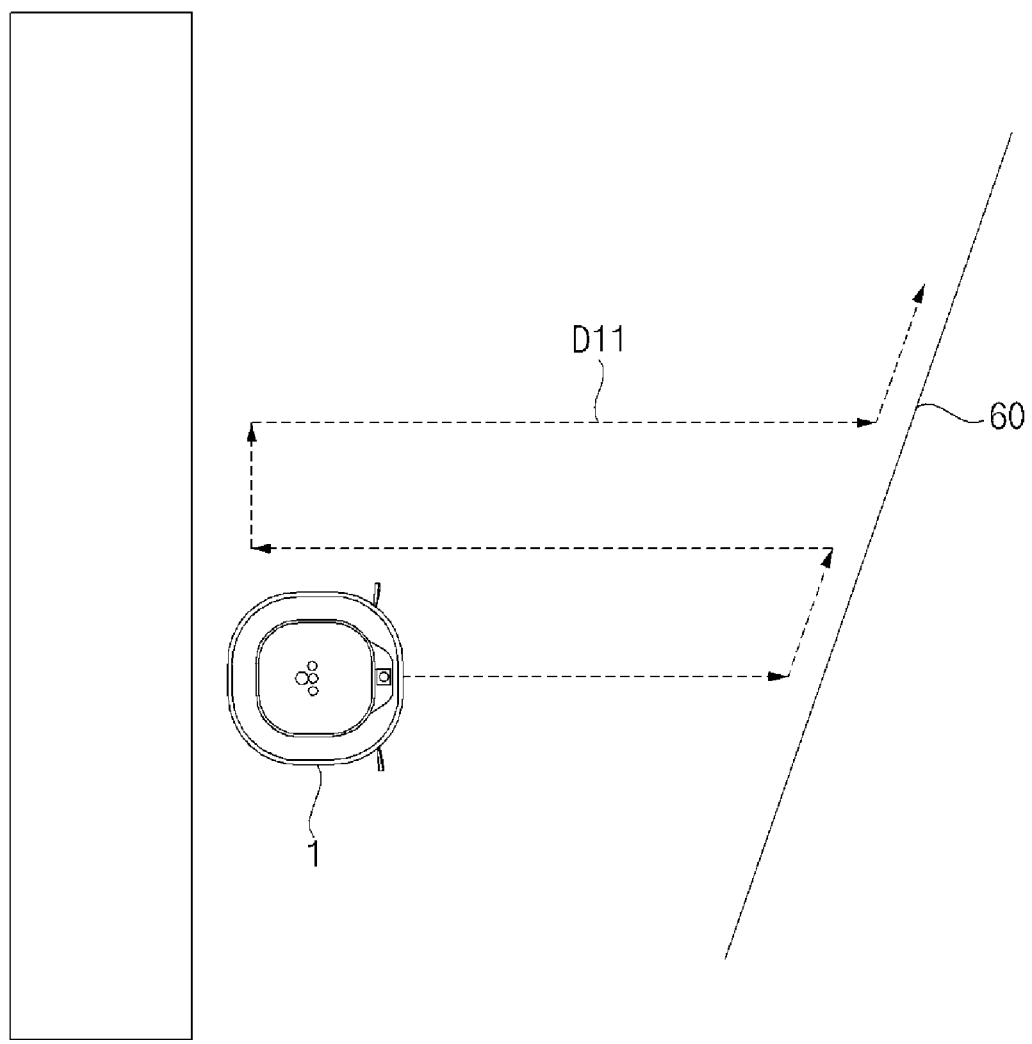

FIG. 18 and FIG. 19 are a diagram for explaining traveling of a mobile robot, when a virtual wall is set according to an embodiment of the present disclosure. As described above, when the virtual wall is set on the map by the terminal, the mobile robot 1 may determine the location of the virtual wall based on the received data, and recognize the virtual wall as an obstacle that actually exists to avoid the virtual wall.

As shown in FIG. 18, the mobile robot 1 may store the received data in the data unit 280, and the travel controller 230 may analyze the data, match the data to the cleaning map, and set the location of the virtual wall on the cleaning map. In addition, the travel controller 230 may set the location of the virtual wall set in the cleaning map to correspond to the actual cleaning area to avoid the obstacle.

When the virtual wall 60 is set in the traveling direction D1, the mobile robot 1 may approach the virtual wall 60 by a certain distance and then change the traveling direction (D2)(D3) to avoid the virtual wall 60. Although there is no physical obstacle in the actual cleaning area, the mobile robot 1 may determine the coordinates of the location of the virtual wall of the cleaning map by matching the location of the virtual wall of the cleaning map with the location of the cleaning area through the virtual wall setting, thereby recognizing the virtual wall as an obstacle to avoid the obstacle.

When approaching the virtual wall 60, the mobile robot 1 may change the travel direction, based on the information of the virtual wall registered in the map, without closely approaching the virtual wall or searching around the virtual wall. At this time, the mobile robot 1 may perform wall following for the virtual wall.

As shown in FIG. 19, in a state where an actual obstacle exists and the virtual wall 60 is set in the form of a line, even when the mobile robot 1 does not search the location of the virtual wall, it may move between the obstacle and the virtual wall based on pre-registered information, and travel through a zigzag traveling route D11 to perform cleaning.

The mobile robot 1 may avoid the virtual wall while maintaining a certain distance from the virtual wall as if there is an actual obstacle, based on the information of the virtual wall set on the map. In addition, if the cleaning command for the area is input, when the virtual wall 60 is set in a corresponding area, the mobile robot 1 may set the traveling route in consideration of the location of the virtual wall 60 to perform cleaning.

Figure 20:
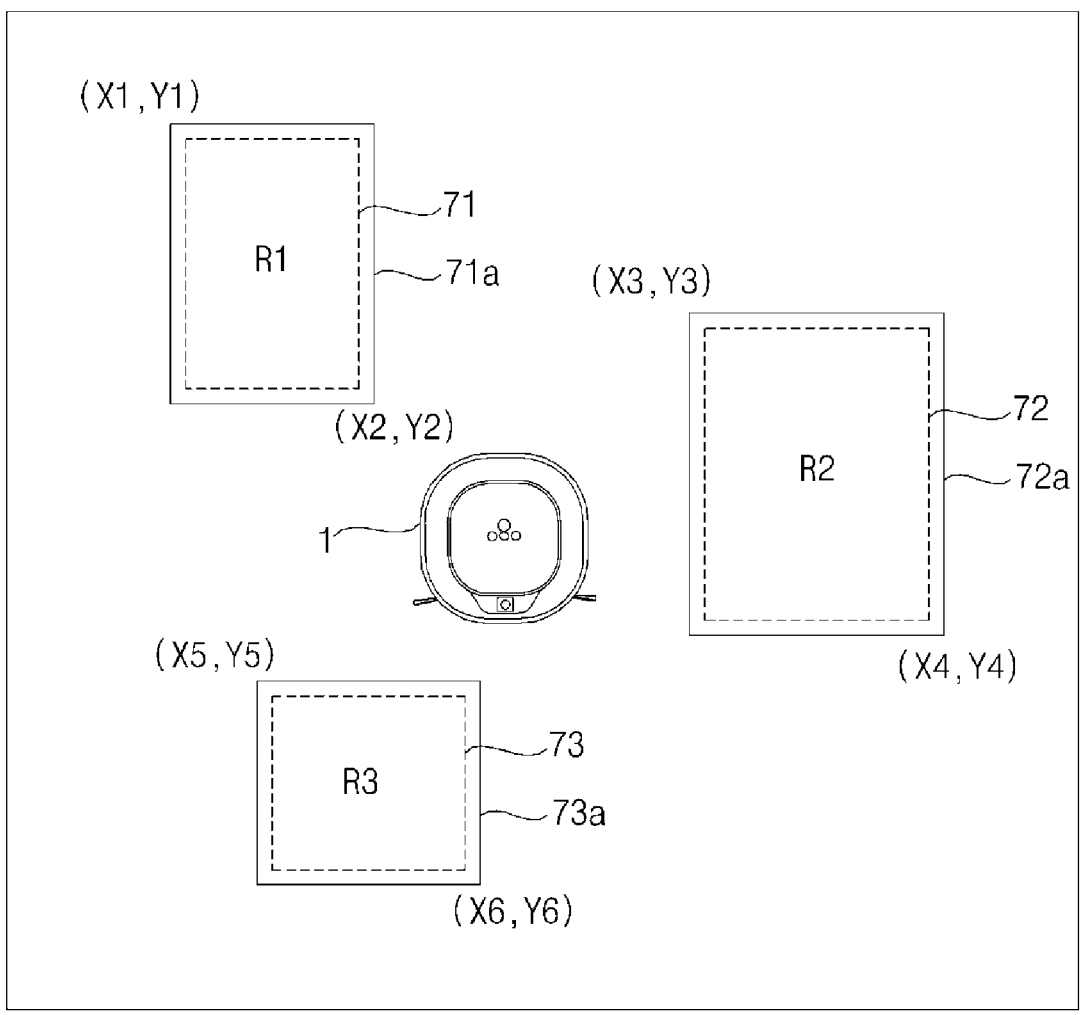
FIG. 20 is a diagram illustrating an example in which a set virtual wall is applied to a cleaning area according to an embodiment of the present disclosure.

FIG. 20 is a diagram illustrating an example in which a set virtual wall is applied to a cleaning area according to an embodiment of the present disclosure. As shown in FIG. 20, when receiving the data of the virtual wall from the terminal 300, the mobile robot 1 may determine the location of eleventh to thirteenth virtual walls 71 to 73 set by the terminal, and set fourteenth to sixteenth virtual walls 71a to 73a in a range wider than the set virtual wall.

The map generation unit 220 may first determine the location on the cleaning map with respect to the eleventh to thirteenth virtual walls set by the terminal, and then expand the virtual wall to set the fourteenth to sixteenth virtual walls for the cleaning area to register in the cleaning map as an obstacle. The travel controller 230 may travel to perform cleaning based on the cleaning map, and control the traveling so as not to touch the virtual wall, with respect to the virtual wall set as the obstacle.

When the main body 10 is traveling, in the process of avoiding the virtual wall to perform cleaning after approaching the virtual wall by a certain distance, the mobile robot 1 may control the traveling based on the virtual wall expanded more than the set virtual wall so that the main body 10 may not touch the virtual wall or a part of the main body may be prevented from intruding into the virtual wall.

Figure 21:
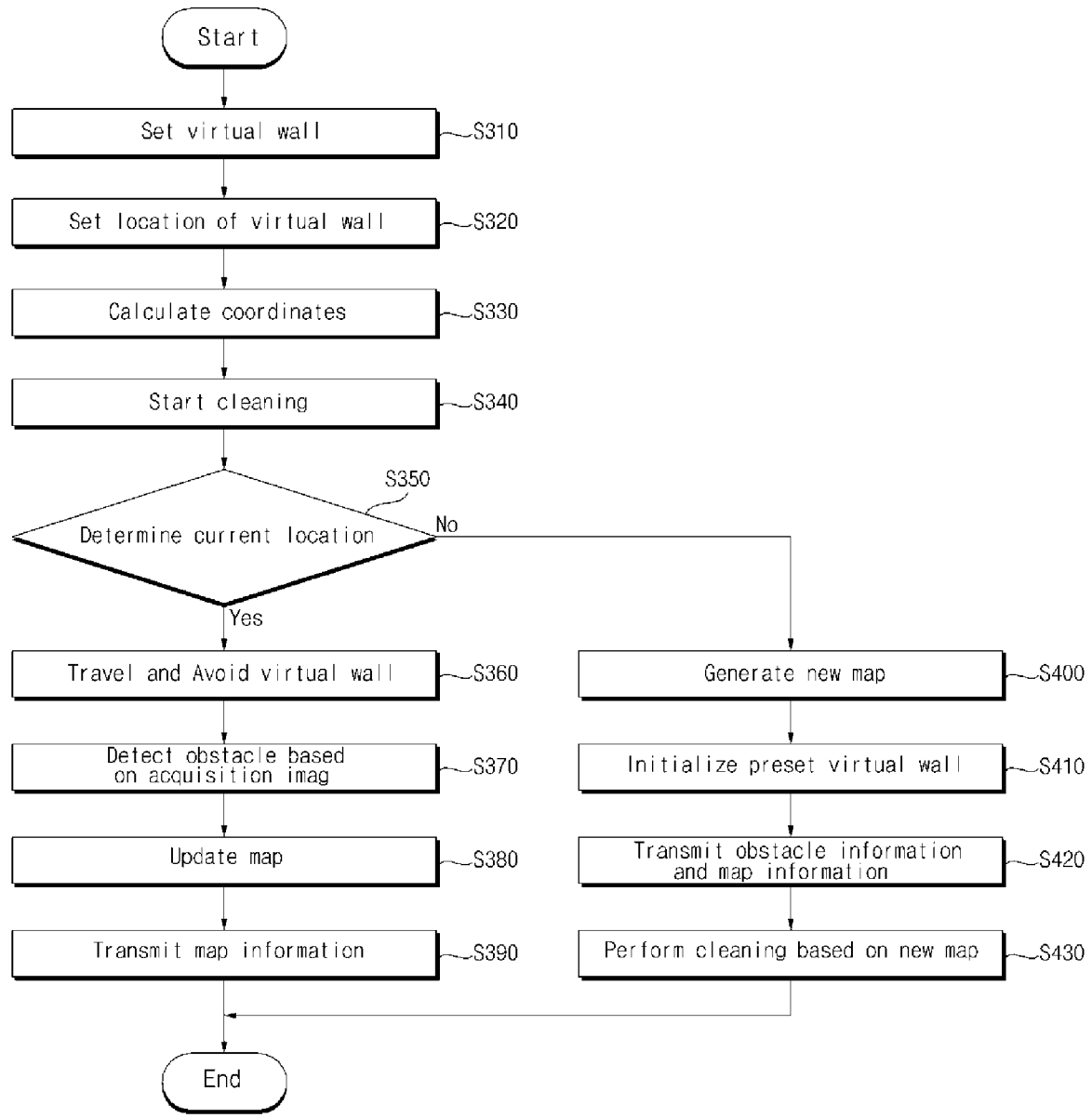
FIG. 21 is a flowchart illustrating a method of controlling a mobile robot by using a virtual wall according to an embodiment of the present disclosure.

FIG. 21 is a flowchart illustrating a method of controlling a mobile robot by using a virtual wall according to an embodiment of the present disclosure. As shown in FIG. 21, when a virtual wall is set through the terminal 300 (S310), the terminal may transmit data of the virtual wall to the mobile robot 1.

The mobile robot 1 may analyze the received data and set the location of the virtual wall on the cleaning map (S320). The mobile robot 1 may expand the virtual wall set by the terminal 300 to set the location of the virtual wall. The map generation unit 220 may register the virtual wall in the cleaning map as an obstacle.

The mobile robot 1 may calculate coordinates corresponding to the cleaning area with respect to the set virtual wall (S330). The map generation unit may calculate coordinates corresponding to the cleaning area with respect to the virtual wall, and input the coordinates to the travel controller.

When the cleaning command is inputted, the mobile robot 1 may start cleaning according to the cleaning setting (S340). The mobile robot 1 may determine the current location of the main body 10 before moving to the designated area (S350). The location recognition unit 240 may analyze the input acquisition image and compare the acquisition image with information of the previously stored cleaning map to determine the current location.

When the current location can be checked, the location recognition unit 240 may set the location of the main body 10 on the stored cleaning map. The travel controller 230 may control the travel driving unit 250 to move to the designated area based on the current location.

The travel controller 230 may control to travel and avoid the virtual wall, based on the coordinates input from the map generation unit. Even if the obstacle recognition unit determines that there is no obstacle by analyzing the acquisition image input from the obstacle detection unit 100, the travel controller 230 may recognize that an obstacle exists based on the coordinates of the virtual wall and may control the travel driving unit 250 to avoid the virtual wall. The travel controller 230 may control to achieve traveling based on the cleaning map and control the cleaning unit 260.

The obstacle recognition unit 210 may detect an obstacle based on the acquisition image input from the obstacle detection unit 100 during the traveling (S370). When an obstacle not registered in the cleaning map is detected, based on the obstacle information of the obstacle recognition unit 210, the map generation unit 220 may register the location of the obstacle in the cleaning map to update (S380).

The travel controller 230 may check the remaining amount of the battery during the traveling, and determine the location of the charging stand 59 on the cleaning map to enable to return to the charging stand when charging is required. The map generation unit 220 may update the cleaning map based on the obstacle information, and update the user map and the guide map based on the cleaning map (S380).

The controller 200 may transmit map information related to the updated user map and guide map to the terminal 300 through the communication unit 270 (S390). Accordingly, the terminal 300 may update and display the map displayed on the screen, i.e., the user map or the guide map based on the received data.

Meanwhile, when the current location cannot be checked through the location recognition unit 240, the mobile robot 1 may travel from the current location and generate a new map (S400). The obstacle detection unit 100 may input the acquisition image for the front side, and the obstacle recognition unit 210 may analyze the acquisition image to determine the location and shape of the obstacle. The map generation unit 220 may generate a map of the cleaning area based on the obstacle information of the obstacle recognition unit 210.

The map generation unit 220 may initialize a preset virtual wall (S410), and transmit the obstacle information and the newly generated map information to the terminal 300 (S420). The terminal may output a new user map and guide map on the screen in response to the received map information.

The mobile robot 1 may travel in the cleaning area based on the new map and perform cleaning (S430). When a new virtual wall is set through the terminal 300, the location of the virtual wall may be registered as described above, and the virtual wall may be avoided to perform cleaning.

Hence, the mobile robot 1 of the present disclosure may generate a map based on the detected obstacle information, and perform cleaning based on the generated map. The terminal may set the virtual wall for restricting the travel of the mobile robot 1 to the generated map, and the mobile robot 1 may avoid the virtual wall based on the information of the virtual wall set on the map even if the mobile robot 1 does not approach the virtual wall closely. Accordingly, the mobile robot can travel without unnecessarily searching the virtual wall, and the traveling of the mobile robot can be effectively controlled.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

The present disclosure has been made in view of the above problems, and provides a mobile robot system which restricts a travel of a mobile robot by setting a virtual wall so as to prevent the mobile robot from approaching within a cleaning area, and a control method thereof.

In accordance with an aspect of the present disclosure, a mobile robot system includes: a mobile robot configured to travel in a cleaning area and suck foreign substances; and a terminal configured to input a cleaning command to the mobile robot, wherein the mobile robot includes: a data unit configured to store a map for the cleaning area; an obstacle detection unit configured to detect an obstacle for a front of the mobile robot and input an obstacle detection signal; and a controller configured to determine an obstacle in response to the obstacle detection signal input from the obstacle detection unit, generate the map including information on a travelable area of the cleaning area based on information on the obstacle, and control to pass or avoid the obstacle while traveling in the cleaning area based on the map, wherein, when a virtual wall for restricting an approach of the mobile robot is set by the terminal, the controller registers the virtual wall on the map and calculates location of the virtual wall for the cleaning area to avoid the virtual wall.

The controller registers the virtual wall as an obstacle on the map. The controller analyzes data of the virtual wall received from the terminal, and expands area of the virtual wall to register on the map. The controller recognizes and avoids the virtual wall as an obstacle, even if the obstacle is not detected from the obstacle detection signal input from the obstacle detection unit.

The controller calculates coordinates of the virtual wall for the cleaning area and controls traveling so as not to touch the virtual wall or intrude into the virtual wall. When the cleaning command is input from the terminal, the controller determines current location corresponding to the map, moves to designated area and performs cleaning, and generates a new map for the cleaning area when the current location cannot be determined.

The controller initializes a preset virtual wall, when generating a new map. The terminal receives the map including information on the travelable area of the mobile robot and displays the map on a screen, and sets the virtual wall for restricting the approach of the mobile robot to the map in response to user input. The user input is a key input or a touch input.

The terminal sets the virtual wall in a form of a line connecting a point and a point. The terminal sets the virtual wall in a form of a surface connecting a plurality of points.

The terminal sets the virtual wall to any one of a rectangular shape, a circular shape, a polygonal shape, and a free shape. The terminal sets the virtual wall in response to an input by touch, drag after touch, and multi-touch.

The terminal sets the virtual wall corresponding to any one of a number of touched points, a number of touches, a dragged direction, and a dragged shape. The terminal changes any one of a location, a shape, and a size of the virtual wall corresponding to one of a touched location, a dragged direction, and a dragged shape.

The terminal displays either a user map in which an outline and shape of the travelable area of the mobile robot is processed or a guide map in which the travelable area is superimposed on the user map, and sets the virtual wall on the map.

In accordance with another aspect of the present disclosure, a method of controlling a mobile robot system includes: acquiring obstacle information acquired by traveling in a cleaning area to generate a map for the cleaning area, by the mobile robot; setting a virtual wall for restricting an approach of the mobile robot in response to the map, by a terminal; registering the virtual wall on the map; calculating a location of the virtual wall for the cleaning area; and avoiding the virtual wall, when approaching the virtual wall, while traveling according to a cleaning command.

Registering the virtual wall on the map includes analyzing data of the virtual wall received from the terminal, and registering the virtual wall as an obstacle in the map. Avoiding the virtual wall includes calculating coordinates of the virtual wall for the cleaning area, and recognizing and avoiding the virtual wall as an obstacle, even if the obstacle is not detected by an obstacle detection unit.

The method of controlling a mobile robot system further includes determining a current location corresponding to the map, when the cleaning command is input from the terminal; moving to a designated area and performing cleaning, when the current location is determined; and generating a new map for the cleaning area, when the current location cannot be determined.

The method of controlling a mobile robot system further includes initializing a preset virtual wall, when generating the new map. The method of controlling a mobile robot system further includes receiving the map including information on a travelable area of the mobile robot, after generating the map, by the terminal; and displaying the map on a screen and setting the virtual wall on the map in response to user input, by the terminal.

The virtual wall is set in a form of any one of a point, a line, and a surface. The virtual wall is set to any one of a rectangular shape, a circular shape, a polygonal shape, and a free shape.

Setting the virtual wall includes connecting a plurality of touch points to set the virtual wall. Setting the virtual wall on the map includes setting the virtual wall in response to a dragged direction or a dragged shape after touch.

The method of controlling a mobile robot system further includes moving the virtual wall to any one of an upper, a lower, a left, and a right in response to a dragged direction, when the virtual wall is selected, after setting the virtual wall. The method of controlling a mobile robot system further includes rotating and changing the virtual wall in response to a dragged direction, with a center of the virtual wall as an axis, when the virtual wall is selected, after setting the virtual wall. The method of controlling a mobile robot system further includes, after setting the virtual wall, when a point of the virtual wall is selected, changing a shape of the virtual wall by moving a location of the point in response to a dragged direction.

The mobile robot system and the control method of the same according to the present disclosure may set a virtual wall in the cleaning area traveled by the mobile robot through a map, and restrict the approaching of the mobile robot by matching with a cleaning area, thereby preventing the damage due to the approaching of mobile robot or the damage of mobile robot.

The present disclosure may set a virtual wall on a map through a terminal and control the mobile robot in such a manner that an actual physical obstacle exists by matching with an actual cleaning area so that the traveling of the mobile robot can be controlled even if an apparatus for generating an actual signal is not installed. In addition, since the mobile robot checks the location and size of the virtual wall through the map, it is possible to avoid the virtual wall without repeatedly searching the virtual wall around the virtual wall. Accordingly, a wall following for the virtual wall can be achieved, and the traveling route can be previously set in consideration of the location of the virtual wall with respect to the area in which the virtual wall is set, thereby improving the traveling efficiency.

Further, since the present disclosure does not require a space for installing a physical apparatus, there is no space restriction, and since it may be plurally set at a desired location irrespective of the number, without disturbing the movement of the user in the area, thereby achieving an easy cleaning setting and effectively controlling the mobile robot.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present disclosure.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the disclosure. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile robot comprising:
a memory that stores a map of an area through which the mobile robot travels;
a communication interface that receives a command from a terminal;
an obstacle sensor that detects an obstacle in the area; and
a controller that updates the map to include information on a travelable portion of the area based on information on the obstacle received from the obstacle sensor, and controls a movement of the mobile robot to pass or avoid the obstacle while traveling in the area based on the map,
wherein, when the command relates to a virtual wall to restrict the movement of the mobile robot, the controller further registers the virtual wall on the map and controls the movement of the mobile robot through the area to avoid a location associated with the virtual wall, and
wherein the controller analyzes data of the virtual wall received from the terminal, determines an area on the map with respect to the virtual wall, and expands the area of the virtual wall to a wider range to register on the map, and the controller recognizes and avoids the expanded area of the virtual wall as an obstacle even when the obstacle sensor does not detect an actual obstacle in the location associated with the virtual wall.

2. The mobile robot of claim 1, wherein the controller registers the virtual wall as an obstacle on the map.

3. The mobile robot of claim 1, wherein the controller calculates coordinates of the virtual wall in the area and controls the movement of the mobile robot so as not to contact or enter the coordinates of the virtual wall.

4. The mobile robot of claim 1, wherein, when the command is received from the terminal, the controller:
determines a current location corresponding to the map,
moves the mobile robot to a designated area to perform cleaning,
generates a new map for the area when the current location cannot be determined, and
initializes a preset virtual wall when generating the new map.

5. The mobile robot of claim 1, wherein the controller further forwards data related to the map via the communication interface to the terminal, the data including information on the travelable area of the mobile robot, and
wherein the terminal displays the map, and sets the virtual wall for restricting the movement of the mobile robot in response to a user input with respect to the displayed map.

6. The mobile robot of claim 1, wherein the terminal sets the virtual wall in a form of a line connecting two points or in a form of a surface connecting a plurality of points.

7. The mobile robot of claim 1, wherein the terminal sets the virtual wall to at least one of a rectangular shape, a circular shape, a polygonal shape, or a free shape.

8. The mobile robot of claim 1, wherein the terminal sets the virtual wall in response to at least one of an input by touch, a drag after touch, or a multi-touch.

9. The mobile robot of claim 1, wherein the terminal sets the virtual wall corresponding to at least one of a number of touched points, a number of touches, a dragged direction, or a dragged shape.

10. The mobile robot of claim 1, wherein the terminal changes at least one of a location, a shape, or a size of the virtual wall corresponding to one of a touched location, a dragged direction, and a dragged shape associated with a user input.

11. A method of controlling a mobile robot, the method comprising:
    acquiring, by the mobile robot, obstacle information when traveling in an area, the obstacle information being used to generate a map for the area;
    receiving, by the mobile robot, instructions from a terminal related to setting a virtual wall restricting a movement of the mobile robot;
    analyzing data of the virtual wall received from the terminal and determining an area on the map with respect to the virtual wall;
    expanding the area of the virtual wall to a wider range;
    registering, by the mobile robot, the expanded area of the virtual wall on the map;
    calculating, by the mobile robot, a location of the virtual wall for the cleaning area;
    calculating coordinates of the virtual wall in the cleaning area; and
    avoiding a region associated with the coordinates of the virtual wall as an obstacle, even when an actual obstacle is not detected by the mobile robot in the region associated with the coordinates, while traveling through the area.

12. The method of claim 11, further comprising:
    determining a current location corresponding to the map, when the instructions are received from the terminal;
    moving to a designated area and performing cleaning, when the current location is determined;
    generating a new map for the area, when the current location cannot be determined; and
    initializing a preset virtual wall, when generating the new map.

13. The method of claim 11, further comprising:
    forwarding, by the mobile robot, information on a travelable area of the mobile robot based on the map,
    the terminal displaying the map on a touch screen and receiving, via the touch screen, a user input related to the virtual wall on the map.

14. The method of claim 13, wherein the virtual wall is set in a form of one or more of a point, a line, a surface, a rectangular shape, a circular shape, a polygonal shape, or a free shape.

15. The method of claim 14, wherein the virtual wall is set based on at least one of connecting a plurality of touch points associated with the user input or a dragged direction or a dragged shape associated with the user input.

16. The method of claim 13, further comprising at least one of moving, rotating, or changing the virtual wall, in response to a dragged direction of a touch input selecting the virtual wall after the virtual wall is set.

17. The mobile robot of claim 1, wherein the obstacle sensor includes a first pattern emitter, a second pattern emitter, and an image sensor to acquire an image of patterns irradiated by the first pattern emitter and the second pattern emitter,
    wherein a first pattern irradiation unit, a second pattern irradiation unit, and an image acquiring unit are positioned to be arranged vertically along a line.

18. The mobile robot of claim 1, wherein the controller, when controlling the movement of the mobile robot to avoid the location associated with the virtual wall is further configured to control the movement such that the moving robot maintains a certain distance from the virtual wall.

* * * * *